United States Patent
Jiang

(10) Patent No.: US 11,348,080 B2
(45) Date of Patent: May 31, 2022

(54) OPEN ROAD TOLLING METHOD, APPARATUS, AND ELECTRONIC DEVICE

(71) Applicant: Advanced New Technologies Co., Ltd., George Town (KY)

(72) Inventor: Guofei Jiang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/889,760

(22) Filed: Jun. 1, 2020

(65) Prior Publication Data

US 2020/0294016 A1    Sep. 17, 2020

Related U.S. Application Data

(63) Continuation of application No. PCT/CN2019/075777, filed on Feb. 22, 2019.

(30) Foreign Application Priority Data

May 31, 2018    (CN) .......................... 201810556571.1

(51) Int. Cl.
*G07B 15/04*    (2006.01)
*G07B 15/06*    (2011.01)
(Continued)

(52) U.S. Cl.
CPC ....... *G06Q 20/145* (2013.01); *G06K 7/10366* (2013.01); *G06Q 10/10* (2013.01);
(Continued)

(58) Field of Classification Search
CPC ... G06Q 20/145; G06Q 2240/00; H04W 4/44; G07B 15/04; G07B 15/063; G07B 15/02; G07B 15/06; H04L 9/32; H04L 67/12
See application file for complete search history.

(56) References Cited

U.S. PATENT DOCUMENTS

| 7,106,212 B2 | 9/2006 | Konishi et al. |
| 10,204,459 B1 * | 2/2019 | Martin ................. G07B 15/063 |

(Continued)

FOREIGN PATENT DOCUMENTS

| CN | 101071516 | 11/2007 |
| CN | 101241609 | 8/2008 |

(Continued)

OTHER PUBLICATIONS

Burgess, Matt, "What is the Internet of Things? WIRED explains," Feb. 16, 2018, Wired.co.uk, https://www.wired.co.uk/article/internet-of-things-what-is-explained-iot (Year: 2018).*

(Continued)

*Primary Examiner* — Emmett K. Walsh
*Assistant Examiner* — Michelle E Carey
(74) *Attorney, Agent, or Firm* — Fish & Richardson P.C.

(57) ABSTRACT

Disclosed herein are methods, systems, and apparatus, including computer programs encoded on computer storage media, for toll fee charging. One of the computer-implemented methods includes obtaining information of a vehicle traveling on a toll road, where the vehicle is associated with a user account on a payment platform. For the vehicle and to a blockchain, recording a travel history by using a blockchain node corresponding to the tolling system in a blockchain network, where the travel history comprises a distance the vehicle is driven on the toll road. In response to determining that the distance the vehicle is driven reaches a predetermined distance, charging a toll fee using the payment platform.

21 Claims, 10 Drawing Sheets

(51) Int. Cl.
  *G06Q 20/14* (2012.01)
  *H04W 4/44* (2018.01)
  *G06K 7/10* (2006.01)
  *G06Q 10/10* (2012.01)
  *G06Q 20/10* (2012.01)
  *G06Q 40/02* (2012.01)
  *H04L 9/32* (2006.01)
  *H04L 67/12* (2022.01)

(52) U.S. Cl.
  CPC ......... *G06Q 20/108* (2013.01); *G06Q 40/02* (2013.01); *G07B 15/04* (2013.01); *G07B 15/063* (2013.01); *H04L 9/32* (2013.01); *H04L 67/12* (2013.01); *H04W 4/44* (2018.02); *G06Q 2240/00* (2013.01)

(56) References Cited

U.S. PATENT DOCUMENTS

| | | | |
|---|---|---|---|
| 11,037,143 B2* | 6/2021 | Shao | G06Q 20/10 |
| 2002/0124638 A1* | 9/2002 | Turner | G01N 3/56 73/146 |
| 2006/0145893 A1* | 7/2006 | Hassett | G07B 15/063 340/928 |
| 2009/0121898 A1 | 5/2009 | Jia et al. | |
| 2012/0215594 A1* | 8/2012 | Gravelle | G07B 15/02 705/13 |
| 2013/0144687 A1 | 6/2013 | Smely | |
| 2014/0074567 A1 | 3/2014 | Hedley et al. | |
| 2016/0203651 A1* | 7/2016 | Heath | H04W 4/40 705/13 |
| 2016/0232500 A1 | 8/2016 | Wang et al. | |
| 2017/0046669 A1 | 2/2017 | Chow et al. | |
| 2017/0178417 A1 | 6/2017 | Bekas et al. | |
| 2018/0018723 A1 | 1/2018 | Nagla et al. | |
| 2018/0101914 A1 | 4/2018 | Samuel et al. | |
| 2018/0139043 A1 | 5/2018 | Jayachandran et al. | |
| 2018/0276674 A1* | 9/2018 | Ramatchandirane | G06F 21/6254 |
| 2019/0180519 A1* | 6/2019 | Hausman | H04L 9/0643 |
| 2019/0266601 A1* | 8/2019 | Allen | G06F 21/645 |
| 2019/0370798 A1* | 12/2019 | Hu | G06F 16/27 |
| 2019/0370807 A1* | 12/2019 | Hu | G06Q 20/10 |
| 2019/0370809 A1* | 12/2019 | Hu | G06Q 20/10 |
| 2019/0370811 A1* | 12/2019 | Zhang | H04L 9/0637 |

FOREIGN PATENT DOCUMENTS

| | | |
|---|---|---|
| CN | 101811481 | 8/2010 |
| CN | 102044154 | 5/2011 |
| CN | 102855671 | 1/2013 |
| CN | 102915569 | 2/2013 |
| CN | 102938087 | 2/2013 |
| CN | 203133903 | 8/2013 |
| CN | 103700149 | 4/2014 |
| CN | 104021594 | 9/2014 |
| CN | 104112296 | 10/2014 |
| CN | 104157017 | 11/2014 |
| CN | 104282045 | 1/2015 |
| CN | 105069850 | 11/2015 |
| CN | 105469453 | 4/2016 |
| CN | 105488722 | 4/2016 |
| CN | 105590346 | 5/2016 |
| CN | 105741367 | 7/2016 |
| CN | 106504355 | 3/2017 |
| CN | 106228840 | 7/2017 |
| CN | 106952352 | 7/2017 |
| CN | 106960594 | 7/2017 |
| CN | 107122937 | 9/2017 |
| CN | 107194778 | 9/2017 |
| CN | 107316347 | 11/2017 |
| CN | 107330681 | 11/2017 |
| CN | 107464118 | 12/2017 |
| CN | 107492262 | 12/2017 |
| CN | 107993298 | 5/2018 |
| CN | 108038925 | 5/2018 |
| CN | 108064017 | 5/2018 |
| CN | 108091167 | 5/2018 |
| CN | 108805995 | 11/2018 |
| CN | 108876937 | 11/2018 |
| CN | 108876946 | 11/2018 |
| CN | 108876947 | 11/2018 |
| DE | 29617339 | 1/1997 |
| JP | 2001022980 | 1/2001 |
| JP | 3824867 | 9/2006 |
| JP | 3824876 | 9/2006 |
| JP | 2008097616 | 4/2008 |
| JP | 2009199442 | 9/2009 |
| JP | 2011060152 | 3/2011 |
| JP | 5380139 | 1/2014 |
| JP | 2015184999 | 10/2015 |
| KR | 20170001870 | 1/2017 |
| KR | 20170104868 | 9/2017 |
| TW | 543010 | 7/2003 |
| TW | 582603 | 4/2004 |
| WO | WO 2017041644 | 3/2017 |

OTHER PUBLICATIONS

Koester, W. (2018). Why is blockchain suddenly so hot? CFO.Com, Retrieved from https://dialog.proquest.com/professional/docview/1999798924?accountid=131444 (Year: 2018).*

Crosby et al., "BlockChain Technology: Beyond Bitcoin," Sutardja Center for Entrepreneurship & Technology Technical Report, Oct. 16, 2015, 35 pages.

Hoi, "Blockchain-Genesis Block, Block, Merkle Tree, Hash," Jan. 16, 2018, retrieved on Jun. 17, 2020, retrieved at URL <https://www.samsonhoi.com/274/blockchain_genesis_block_merkle_tree>, 21 pages (with English translation).

Nakamoto, "Bitcoin: A Peer-to-Peer Electronic Cash System," www.bitcoin.org, 2005, 9 pages.

PCT International Search Report and Written Opinion in International Appln No. PCT/CN2019/075775, dated May 9, 2019, 9 pages (with partial English translation).

PCT International Search Report and Written Opinion in International Appln. No. PCT/CN2019/075747, dated Dec. 5, 2019, 16 pages (with English translation).

PCT International Search Report and Written Opinion in International Appln. No. PCT/CN2019/075776, dated Dec. 5, 2019, 16 pages (with English translation).

PCT International Search Report and Written Opinion in International Appln. No. PCT/CN2019/075777, dated May 5, 2019, 17 pages (with English translation).

Wu et al., "The Introduction of ETC System and Implementation Achievement," Civil Engineering and Water Resources, Apr. 2018, 45(2):32-38 (with English Abstract).

EP Extended Search Report in European Application No. 19811712.9, dated Feb. 2, 2021, 14 pages.

PCT International Preliminary Report on Patentability in International Application No. PCT/CN2019/075777, dated Dec. 1, 2020, 10 pages (with English translation).

* cited by examiner

OPEN ROAD TOLLING METHOD, APPARATUS, AND ELECTRONIC DEVICE

CROSS-REFERENCE TO RELATED APPLICATIONS

This application is a continuation of PCT Application No. PCT/CN2019/075777, filed on Feb. 22, 2019, which claims priority to Chinese Patent Application No. 201810556571.1, filed on May 31, 2018, and each application is hereby incorporated by reference in its entirety.

TECHNICAL FIELD

One or more implementations of the present specification relate to the field of end-user device technologies, and in particular, to open road tolling methods, apparatuses, and electronic devices.

BACKGROUND

Vehicle tolls of toll road users are charged for reclaiming costs of toll road construction and maintenance, so as to implement sustainable toll road maintenance. Specifically, a user can pay a corresponding amount of assets to a toll road owner based on a traveled distance of a vehicle on a toll road. Therefore, the traveled distance of the vehicle needs to be calculated in a certain way, so that the user is charged a corresponding toll.

SUMMARY

In view of this, one or more implementations of the present specification provide open road tolling methods, apparatuses, and electronic devices.

To achieve the previous objective, one or more implementations of the present specification provide the following technical solutions:

A first aspect of the one or more implementations of the present specification provides an open road tolling method, applied to a tolling system, where the method includes the following: obtaining vehicle information of a driving vehicle on a toll road, where the vehicle information has a corresponding user account on a payment platform; publishing a vehicle travel history to a blockchain network by using a first blockchain node corresponding to the tolling system in the blockchain network, where the vehicle travel record includes a traveled distance of the driving vehicle on the toll road; and performing an asset transfer operation related to the payment platform based on the vehicle travel record each time the traveled distance of the driving vehicle on the toll road reaches a predetermined distance, so as to charge an asset corresponding to the predetermined distance.

A second aspect of the one or more implementations of the present specification provides an open road tolling method, applied to a tolling system, where the method includes the following: obtaining vehicle information of a driving vehicle on a toll road, where the vehicle information has a corresponding user account on a payment platform; publishing a vehicle travel history to a blockchain network by using a first blockchain node corresponding to the tolling system in the blockchain network, where the vehicle travel history includes a traveled distance of the driving vehicle on the toll road; and performing an asset transfer operation related to the payment platform based on the vehicle travel history each time the driving vehicle approaches any exit of the toll road, so as to charge an asset corresponding to the traveled distance.

A third aspect of the one or more implementations of the present specification provides an open road tolling apparatus, applied to a tolling system, where the apparatus includes the following: an acquisition unit, configured to obtain vehicle information of a driving vehicle on a toll road, where the vehicle information has a corresponding user account on a payment platform; a publishing unit, configured to publish a vehicle travel history to a blockchain network by using a first blockchain node corresponding to the tolling system in the blockchain network, where the vehicle travel history includes a traveled distance of the driving vehicle on the toll road; and an implementation unit, configured to perform an asset transfer operation related to the payment platform based on the vehicle travel history each time the traveled distance of the driving vehicle on the toll road reaches a predetermined distance, so as to charge an asset corresponding to the predetermined distance.

A fourth aspect of the one or more implementations of the present specification provides an open road tolling apparatus, applied to a tolling system, where the apparatus includes the following: an acquisition unit, configured to obtain vehicle information of a driving vehicle on a toll road, where the vehicle information has a corresponding user account on a payment platform; a publishing unit, configured to publish a vehicle travel history to a blockchain network by using a first blockchain node corresponding to the tolling system in the blockchain network, where the vehicle travel history includes a traveled distance of the driving vehicle on the toll road; and an implementation unit, configured to perform an asset transfer operation related to the payment platform based on the vehicle travel history each time the driving vehicle approaches any exit of the toll road, so as to charge an asset corresponding to the traveled distance.

A fifth aspect of the one or more implementations of the present specification provides an electronic device, including the following: a processor; and a memory, configured to store a processor-executable instruction, where the processor is configured to perform the method described in any one of the previous implementations.

DESCRIPTION OF IMPLEMENTATIONS

Example implementations are described in detail here, and examples of the example implementations are presented in the accompanying drawings. When the following description relates to the accompanying drawings, unless specified otherwise, the same numbers in different accompanying drawings represent same or similar elements. Implementations described below do not represent all implementations consistent with one or more implementations of the present specification. On the contrary, the implementations are only examples of apparatuses and methods that are described in the appended claims in detail and consistent with some aspects of one or more implementations of the present specification.

It is worthwhile to note that in other implementations, steps of a corresponding method are not necessarily performed according to the sequence shown and described in the present specification. In some other implementations, the method can include more or less steps than those described in the present specification. In addition, a single step described in the present specification may be divided into a plurality of steps in other implementations for description. However, a plurality of steps described in the present specification may also be combined into a single step for description in other implementations.

Figure 1:
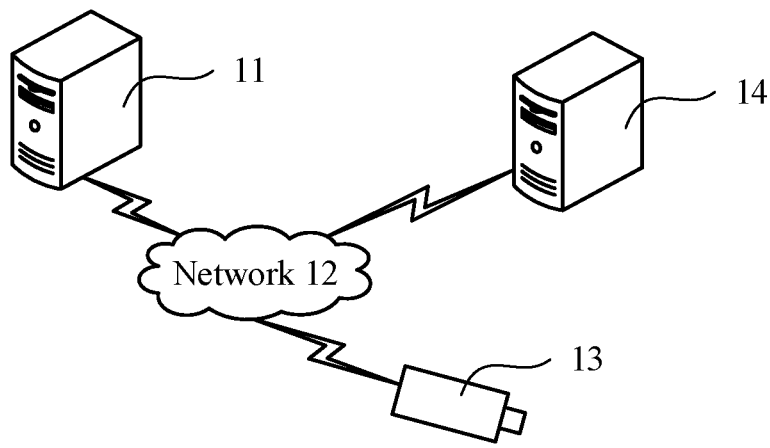
FIG. 1 is a schematic architectural diagram illustrating an open road tolling system, according to an example implementation.

FIG. 1 is a schematic architectural diagram illustrating an open road tolling system, according to an example implementation. As shown in FIG. 1, the system can include a tolling server 11, a network 12, an Internet of Things device 13, and a payment platform server 14.

The tolling server 11 can be a physical server including an independent host, or the tolling server 11 can be a virtual server including a host cluster. In a running process, the tolling server 11 can run and be implemented as a tolling system. When a user drives on a toll road section managed by the tolling system, the tolling system is configured to charge the user.

The Internet of Things device 13 can be implemented as at least one of the following types of electronic devices: a monitoring device, a radio frequency identification (RFID) reader, a Bluetooth device, an optical sensor, a signal receiver, etc. Implementations are not limited in one or more implementations of the present specification. The Internet of Things device 13 is configured to collect information about a driving vehicle on the toll road section, and provide the collected vehicle information to the tolling server 11.

The payment platform server 14 can be a physical server including an independent host, or the payment platform server 14 can be a virtual server including a host cluster. In a running process, the payment platform server 14 can run and be implemented as a payment platform. When a user and the tolling system each have a registered account on the payment platform, the tolling system can initiate a request to the payment platform, so that the payment platform automatically transfers an asset from an account corresponding to the user to an account corresponding to the tolling system.

The network 12 for interaction between the tolling server 11, the Internet of Things device 13, and the payment platform server 14 can include multiple types of wired or wireless networks. In an implementation, the network 12 can include a public switched telephone network (PSTN) and the Internet. Implementations are not limited in the present specification, certainly.

Figure 2:
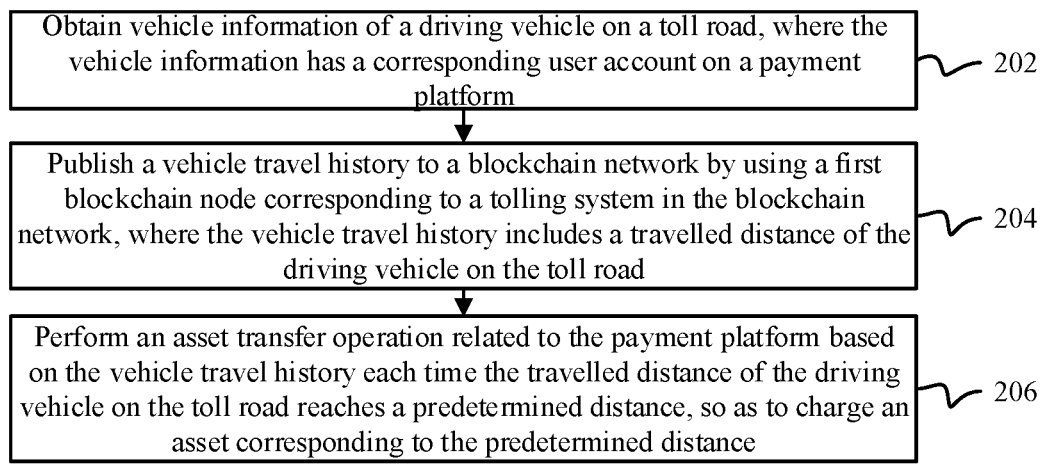
FIG. 2 is a flowchart illustrating an open road tolling method, according to an example implementation.

FIG. 2 is a flowchart illustrating an open road tolling method, according to an example implementation. As shown in FIG. 2, the method is applied to a tolling system (e.g., included in the tolling server 11 shown in FIG. 1), and can include the following steps.

Step 202: Obtain vehicle information of a driving vehicle on a toll road, where the vehicle information has a corresponding user account on a payment platform.

In an implementation, an information acquisition operation can be performed on the driving vehicle on the toll road by using a first Internet of Things device associated with the tolling system, and the vehicle information of the driving vehicle can be determined based on information obtained by the first Internet of Things device. The first Internet of Things device includes at least one of the following: a monitoring device, an RFID reader, a Bluetooth device, an optical sensor, a signal receiver, etc. Implementations are not limited in the present specification.

For example, when the first Internet of Things device includes a monitoring device, the monitoring device can photograph an image of the driving vehicle on the toll road, and analyze content of the photographed image to determine the vehicle information of the driving vehicle.

For example, when the first Internet of Things device includes an RFID reader, the RFID reader can read an RFID signal transmitted by an RFID tag installed on the driving vehicle, where the RFID signal can include the vehicle information of the driving vehicle.

For example, when the first Internet of Things device includes a first Bluetooth device, the Bluetooth device can read a Bluetooth signal sent by a second Bluetooth device installed on the driving vehicle, where the Bluetooth signal can include the vehicle information of the driving vehicle.

For example, when the first Internet of Things device includes an optical sensor, the surface of the driving vehicle can be coated with an optical medium of a predetermined material. The optical medium is used to preserve appearance data of the driving vehicle, and the optical sensor can scan the driving vehicle, so as to obtain body surface structure data of the driving vehicle, and use the body surface structure data as the vehicle information of the driving vehicle. The optical medium can be a nano-optical film. After the nano-optical film is coated on an outer surface of the vehicle, a piece of nano-optical film can be formed, to automatically preserve a vehicle appearance. Accordingly, the optical sensor can be configured to capture light of a specific wavelength generated or reflected by the optical film, so as to accurately generate the body surface structure data of the vehicle.

For example, when the first Internet of Things device includes a signal receiver, the surface of the driving vehicle can be coated with an electrical medium of a predetermined material. The electrical medium is used to preserve appearance data of the driving vehicle, and the signal receiver can scan the driving vehicle, so as to obtain body surface structure data of the driving vehicle, and use the body surface structure data as the vehicle information of the driving vehicle. The electrical medium can be a carbon structural material of a nanometer level. After the carbon structural material is coated on an outer surface of the vehicle, a circuit layer that encloses the vehicle can be formed. The circuit layer can generate an electrical signal uniquely corresponding to the body surface structure data, and send the electrical signal to the signal receiver, so that the electrical signal is used as the vehicle information of the driving vehicle.

In an implementation, the toll road can be divided into several toll road sections, and each first Internet of Things device can correspond to one or more toll road sections, so as to collect information about a driving vehicle on the corresponding toll road section. For example, if an RFID reader is installed at each toll road section, only when a vehicle passes through a corresponding toll road section, the RFID reader can collect an RFID signal transmitted by an RFID tag installed on the vehicle. For another example, if a camera of a monitoring device faces multiple toll road sections, so that an image photographed by the camera covers the toll road sections, information about vehicles driving on the toll road sections can be collected based on the photographed image collected by the camera, so as to obtain corresponding vehicle information.

In an implementation, when it is determined that there is a driving vehicle on the toll road section by using the first Internet of Things device, an information acquisition operation can be further performed on the driving vehicle by using the first Internet of Things device. In other words, the first Internet of Things device can be used to determine that there is a driving vehicle on the toll road section, and can also obtain vehicle information of the driving vehicle. For example, when the first Internet of Things device includes a monitoring device, a photographed image collected by the monitoring device can be used to identify a use status of the toll road section (i.e., whether there is a vehicle driving on the toll road section), and can also be used to identify vehicle information of the driving vehicle on the toll road section (e.g., identify a license plate number of the driving vehicle).

In an implementation, when it is determined that there is a driving vehicle on the toll road section by using a second Internet of Things device associated with the tolling system, an information acquisition operation can be further performed on the driving vehicle by using the first Internet of Things device. In other words, the second Internet of Things device is used to determine that there is a driving vehicle on the toll road section, and the first Internet of Things device is used to obtain vehicle information of the driving vehicle. For example, the second Internet of Things device can include at least one of the following: an underground induction coil, a ranging device, an infrared detection device, etc. Implementations are not limited in the present specification.

For example, when the second Internet of Things device includes an underground induction coil, the underground induction coil can be installed under the ground of the toll road section or at another location, so that a vehicle passing through the toll road section can trigger the underground induction coil. Further, the second Internet of Things device can directly trigger the first Internet of Things device, or trigger the first Internet of Things device by using the tolling system, so that the first Internet of Things device obtains the vehicle information of the driving vehicle on the toll road section.

For example, when the second Internet of Things device includes a ranging device, the ranging device can be installed above the toll road section or at another location for ranging toward the ground of the toll road section, and the vehicle passing through the toll road section can trigger a change of a ranging result of the ranging device. Further, the second Internet of Things device can directly trigger the first Internet of Things device, or trigger the first Internet of Things device by using the tolling system, so that the first Internet of Things device obtains the vehicle information of the driving vehicle on the toll road section.

For example, when the second Internet of Things device includes an infrared detection device, the infrared detection device can be installed above or in front of the toll road section or at another location, so that the vehicle passing through the toll road section can trigger the infrared detection device to generate a predetermined infrared detection result. Further, the second Internet of Things device can directly trigger the first Internet of Things device, or trigger the first Internet of Things device by using the tolling system, so that the first Internet of Things device obtains the vehicle information of the driving vehicle on the toll road section.

In an implementation, the vehicle information can include any information used to represent a vehicle identity, and implementations are not limited in the present specification. For example, the vehicle information can include at least one of the following: a license plate number, a paint color, a vehicle model, body surface structure data, vehicle driver information, vehicle passenger information, etc. Implementations are not limited in the present specification.

Step 204: Publish a vehicle travel history to a blockchain network by using a first blockchain node corresponding to the tolling system in the blockchain network, where the vehicle travel history includes a traveled distance of the driving vehicle on the toll road.

In an implementation, the tolling system has a corresponding first blockchain node in the blockchain network. There are several blockchain nodes in the blockchain network. Distributed accounting is used between the blockchain nodes. Each blockchain node maintains full accounting information, and an agreement can be reached between the blockchain nodes by using a consensus algorithm, so as to ensure that a uniform blockchain ledger is jointly maintained by the blockchain nodes. In other words, the first blockchain node and other blockchain nodes maintain full blockchain ledgers with the same content.

In an implementation, because the tolling system corresponds to the first blockchain node, the vehicle travel history can be published to the blockchain network by using the first blockchain node, so that the vehicle travel history is recorded in the blockchain ledger. Because data registered in the blockchain network cannot be tampered with, the vehicle travel history recorded in the blockchain ledger has enough reliability and can be trusted by each blockchain node. Therefore, in subsequent processes, when an asset transfer operation is initiated to the payment platform based on the vehicle travel history, the payment platform can fully trust information such as the traveled distance included in the vehicle travel history, thereby reducing a risk of automatically making asset transfer and completing open road tolling.

Step 206: Perform an asset transfer operation related to the payment platform based on the vehicle travel history each time the traveled distance of the driving vehicle on the toll road reaches a predetermined distance, so as to charge an asset corresponding to the predetermined distance.

In an implementation, the traveled distance of the driving vehicle on the toll road is counted cyclically, and an asset charging request is initiated to the payment platform each time the traveled distance reaches the predetermined distance, so that a corresponding toll can be charged stage by stage when the driving vehicle drives on the toll road. Therefore, after a driver drives the driving vehicle away from the toll road, toll payment operations including both a payment operation actively performed by the driver and a payment operation automatically triggered by the tolling system for the payment platform are not triggered. Actually, a certain delay may be caused due to processes such as data processing and data transmission even in the payment operation automatically triggered by the tolling system. Therefore, according to the technical solution of the present specification, situations that the delay occurs in the process of driving the driving vehicle away can be reduced, and the process that the driving vehicle drives away from the toll road is not interrupted, so that persons (the driver and a passenger) in the vehicle are unaware of the toll payment process, thereby enhancing user experience.

In an implementation, after the driving vehicle on the toll road is detected, the traveled distance of the driving vehicle on the toll road can start to be recorded. When the traveled distance of the driving vehicle on the toll road reaches the predetermined distance, the tolling system can perform the asset transfer operation related to the payment platform based on the vehicle travel history. After the asset corresponding to the predetermined distance is charged, the tolling system can reset the traveled distance to recalculate the traveled distance. Based on the previous method, the traveled distance of the driving vehicle on the toll road can be counted cyclically, so that a corresponding toll is charged stage by stage in the driving process. Certainly, in addition to the resetting processing for the traveled distance, the traveled distance can be counted cyclically by using another method. Methods are not limited in the present specification.

In an implementation, a value of the predetermined distance can be set based on needs, for example, 1 km, 300 m, 100 m, or 1 m. The predetermined distance is set as small as possible, for example, 1 m, and even a similar effect and feeling of "real-time charging" can be generated, so that the toll of the driving vehicle can be calculated and charged more accurately.

In an implementation, each time the traveled distance reaches the predetermined distance, the tolling system can initiate the asset charging request for the vehicle information to the payment platform, where the asset charging request includes an identifier of the vehicle travel history, for example, the identifier can include a transaction serial number (or other information that uniquely indicates the vehicle travel history) of the vehicle travel history in the blockchain network, so that the payment platform can search a blockchain ledger based on the identifier to determine authenticity and validity of the vehicle travel history. For example, when the payment platform has a corresponding second blockchain node in the blockchain network, the payment platform can view a blockchain ledger maintained by the second blockchain node, to perform verification on a corresponding vehicle travel history. Or, the payment platform can perform verification on a vehicle travel history recorded in a blockchain ledger by using a blockchain node corresponding to another object in the blockchain network.

In an implementation, the asset transfer request can include only the transaction serial number (which is used as an example, and can be another identifier), and the payment platform can calculate a payment amount based on the traveled distance included in the vehicle travel history corresponding to the transaction serial number and a predefined charging criterion.

In an implementation, the asset transfer request can include the transaction serial number and a payment amount, and the payment platform can verify whether the payment amount matches the traveled distance in the vehicle travel history based on a predefined charging criterion (e.g., 1 RMB/km), so as to complete the asset transfer only when the payment amount matches the traveled distance.

In an implementation, the asset transfer request can include the transaction serial number, a payment amount, and a charging criterion, and the payment platform verifies whether the payment amount matches the traveled distance in the vehicle travel history, so as to complete the asset transfer only when the payment amount matches the traveled distance.

In an implementation, the payment platform can transfer an offchain asset (i.e., an asset outside the blockchain network, different from a blockchain asset) based on the asset transfer request initiated by the tolling system. For example, when the vehicle information has a corresponding user account on the payment platform, the payment platform can directly transfer the corresponding asset from the user account to an account of the tolling system on the payment platform. For another example, when a limit of credit of the user account is not exceeded, the charged asset corresponding to the predetermined distance comes from a credit asset related to the user account. For example, the payment platform can transfer the corresponding asset from an account of the payment platform to an account of the tolling system on the payment platform, regardless of whether the user account has sufficient assets. Subsequently, an owner of the user account can transfer the asset advanced by the payment platform to the account of the payment platform at any time within a predetermined time period. Otherwise, the owner needs to transfer more assets to the account of the payment platform after the predetermined time period expires, and the amount of assets is positively correlated with a quantity of days after expiration, which is equivalent to transferring a fine or an interest to the payment platform.

In an implementation, the payment platform can transfer an offchain asset corresponding to the predetermined distance from the user account corresponding to the vehicle information to the account of the payment platform. In addition, the payment platform can initiate a contract operation used for asset transfer by using a corresponding second blockchain node in the blockchain network. After the contract operation takes effect, transfer can be made from a blockchain asset of the payment platform to a blockchain asset of the tolling system, and a transferred blockchain asset is equivalent to the offchain asset charged by the account of the payment platform, so that the payment platform makes both ends meet, which is equivalent to the situation that the tolling system has charged the blockchain asset corresponding to the predetermined distance from the driving vehicle.

In an implementation, after the driving vehicle on the toll road is detected, the tolling system can start to record the traveled distance of the driving vehicle on the toll road. Each time the traveled distance reaches the predetermined distance, the tolling system can initiate a contract operation used for asset transfer by using the first blockchain node, where a validation condition of the contract operation includes that the traveled distance reaches the predetermined distance, so that the contract operation can be triggered to take effect. After the contract operation takes effect, the tolling system can receive, by using the first blockchain node, a blockchain asset corresponding to the predetermined distance and transferred by the second blockchain node. An offchain asset equivalent to the blockchain asset is deducted from the user account by the payment platform. In other words, the payment platform obtains the offchain asset corresponding to the predetermined distance from the user account, and transfers the blockchain asset corresponding to the predetermined distance in the blockchain network, so that the payment platform achieves breakeven, which is equivalent to the situation that the tolling system has charged the blockchain asset corresponding to the predetermined distance from the driving vehicle.

In an implementation, any type of asset such as cash, a security, and a blockchain asset can be used in the present specification to pay the toll, and implementations are not limited in the present specification.

In an implementation, the toll can dynamically change. For example, a toll within 1 km is RMB 0, and a toll over 1 km is 1 RMB/km. Therefore, a total traveled distance of the driving vehicle on the toll road can be counted. Then, the asset charging request is initiated to the payment platform based on a charging criterion corresponding to a distance range within which the total traveled distance falls.

In an implementation, in the present specification, because the tolling system can automatically charge a toll for a vehicle driving on the toll road, no blocking facility needs to be disposed at an exit of the toll road, so that the vehicle can smoothly drive away without stopping. However, it needs to be ensured that a toll can be automatically charged by the tolling system for each vehicle entering the toll road; otherwise, some tolls may be neglected. Therefore, when any vehicle drives to an entrance of the toll road, a query request can be initiated to the payment platform based on vehicle information of the any vehicle. When it is determined that a user account corresponding to the vehicle information of the any vehicle exists on the payment platform, it indicates that the tolling system can automatically charge a toll for the any vehicle based on the present specification, and therefore, can allow the any vehicle to pass, so that the any vehicle enters the toll road; otherwise, the tolling system refuses the any vehicle to pass.

Figure 3:
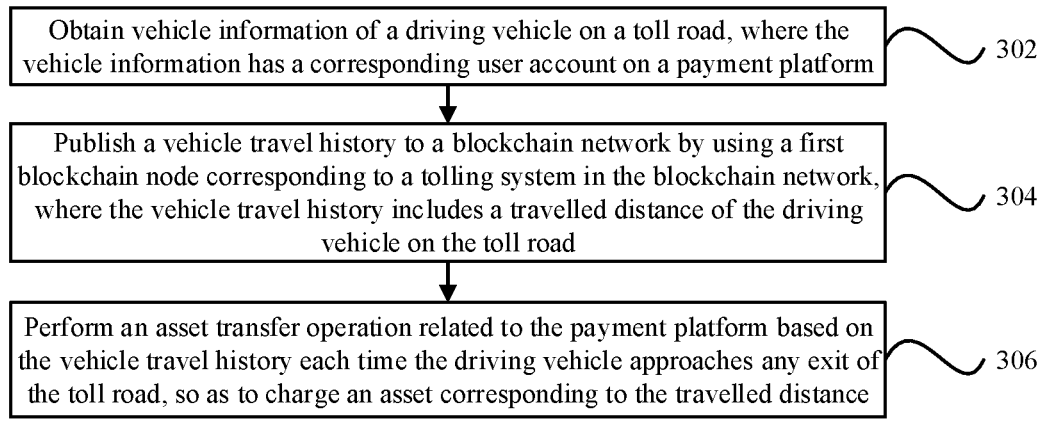
FIG. 3 is a flowchart illustrating another open road tolling method, according to an example implementation.

FIG. 3 is a flowchart illustrating another open road tolling method, according to an example implementation. As shown in FIG. 3, the method is applied to a tolling system (e.g., included in the tolling server 11 shown in FIG. 1), and can include the following steps.

Step 302: Obtain vehicle information of a driving vehicle on a toll road, where the vehicle information has a corresponding user account on a payment platform.

In an implementation, for step 302 and related descriptions, references can be made to step 202 and the related descriptions. Details are omitted here for simplicity.

Step 304: Publish a vehicle travel history to a blockchain network by using a first blockchain node corresponding to the tolling system in the blockchain network, where the vehicle travel history includes a traveled distance of the driving vehicle on the toll road.

In an implementation, for step 304 and related descriptions, references can be made to step 204 and the related descriptions. Details are omitted here for simplicity.

Step 306: Perform an asset transfer operation related to the payment platform based on the vehicle travel history each time the driving vehicle approaches any exit of the toll road, so as to charge an asset corresponding to the traveled distance.

In an implementation, when the driving vehicle does not approach any exit of the toll road, the driving vehicle cannot drive away from the toll road, and therefore, it is unnecessary to frequently and repeatedly initiate an asset charging request to the payment platform and charge the asset, so that interactions are reduced. When the driving vehicle approaches any exit of the toll road, the driving vehicle may drive away from the toll road from the any exit. Therefore, when the driving vehicle approaches the any exit of the toll road, the asset transfer operation related to the payment platform can be performed to charge the corresponding asset. If the driving vehicle does not drive away from an exit, the traveled distance can continue to be counted by using the technical solution of the present specification, so as to charge a toll at the exit subsequently. If the driving vehicle drives away from an exit, because a toll has been charged, the process that the driving vehicle drives away from the toll road is not interrupted, so that persons (a driver and a passenger) in the vehicle are unaware of the toll payment process, thereby enhancing user experience.

In an implementation, the tolling system can send an asset transfer request to the payment platform, where the asset transfer request includes a transaction serial number (or other information that uniquely indicates the vehicle travel history) of the vehicle travel history in the blockchain network, so that the payment platform can search a blockchain ledger based on the transaction serial number to determine authenticity and validity of the vehicle travel history. For example, when the payment platform has a corresponding second blockchain node in the blockchain network, the payment platform can view a blockchain ledger maintained by the second blockchain node, to perform verification on a corresponding vehicle travel history. Alternatively, the payment platform can perform verification on a vehicle travel history recorded in a blockchain ledger by using a blockchain node corresponding to another object in the blockchain network.

In an implementation, the asset transfer request can include only the transaction serial number, and the payment platform can calculate a payment amount based on the traveled distance included in the vehicle travel history corresponding to the transaction serial number and a predefined charging criterion.

In an implementation, the asset transfer request can include the transaction serial number and a payment amount, and the payment platform can verify whether the payment amount matches the traveled distance in the vehicle travel history based on a predefined charging criterion (e.g., 1 RMB/km), so as to complete the asset transfer only when the payment amount matches the traveled distance.

In an implementation, the asset transfer request can include the transaction serial number, a payment amount, and a charging criterion, and the payment platform verifies whether the payment amount matches the traveled distance in the vehicle travel history, so as to complete the asset transfer only when the payment amount matches the traveled distance.

In an implementation, the payment platform can transfer an offchain asset (i.e., an asset outside the blockchain network, different from a blockchain asset) based on the asset transfer request initiated by the tolling system. For example, when the vehicle information has a corresponding user account on the payment platform, the payment platform can directly transfer the corresponding asset from the user account to an account of the tolling system on the payment platform. For another example, when a limit of credit of the user account is not exceeded, the charged asset corresponding to the traveled distance comes from a credit asset related to the user account. For example, the payment platform can transfer the corresponding asset from an account of the payment platform to an account of the tolling system on the payment platform, regardless of whether the user account has sufficient assets. Subsequently, an owner of the user account can transfer the asset advanced by the payment platform to the account of the payment platform at any time within a predetermined time period. Otherwise, the owner needs to transfer more assets to the account of the payment platform after the predetermined time period expires, and the amount of assets is positively correlated with a quantity of days after expiration, which is equivalent to transferring a fine or an interest to the payment platform.

In an implementation, the payment platform can transfer an offchain asset corresponding to the traveled distance from the user account corresponding to the vehicle information to the account of the payment platform. In addition, the payment platform can initiate a contract operation used for asset transfer by using a corresponding second blockchain node in the blockchain network. After the contract operation takes effect, transfer can be made from a blockchain asset of the payment platform to a blockchain asset of the tolling system, and a transferred blockchain asset is equivalent to the offchain asset charged by the account of the payment platform, so that the payment platform makes both ends meet, which is equivalent to the situation that the tolling system has charged the blockchain asset corresponding to the traveled distance from the driving vehicle.

In an implementation, after the driving vehicle on the toll road is detected, the tolling system can start to record the traveled distance of the driving vehicle on the toll road. When it is detected that the driving vehicle approaches any exit of the toll road, the tolling system can initiate a contract operation used for asset transfer by using the first blockchain node. After the contract operation takes effect, the tolling system can receive, by using the first blockchain node, a blockchain asset corresponding to the traveled distance and transferred by the second blockchain node. An offchain asset equivalent to the blockchain asset is deducted from the user account by the payment platform. In other words, the payment platform obtains the offchain asset corresponding to the traveled distance from the user account, and transfers the blockchain asset corresponding to the traveled distance in the blockchain network, so that the payment platform achieves breakeven, which is equivalent to the situation that the tolling system has charged the blockchain asset corresponding to the traveled distance from the driving vehicle.

In an implementation, any type of asset such as cash, a security, and a blockchain asset can be used in the present specification to pay the toll, and implementations are not limited in the present specification.

In an implementation, when it is detected that the driving vehicle is on the toll road, the traveled distance of the driving vehicle can start to be recorded. When the driving vehicle approaches any exit of the toll road, the asset transfer operation related to the payment platform can be performed based on the vehicle travel history. After the asset corresponding to the traveled distance is charged, the tolling system can reset the traveled distance to recalculate the traveled distance. Based on the previous method, the traveled distance of the driving vehicle on the toll road can be counted stage by stage, so that a corresponding toll is charged stage by stage in the driving process. Certainly, in addition to the resetting processing for the traveled distance, the traveled distance can be counted stage by stage by using another method. Methods are not limited in the present specification.

In an implementation, the traveled distance of the driving vehicle on the toll road can be counted. When the traveled distance does not reach the predetermined distance, charging does not have to be performed for the driving vehicle. In this case, the asset transfer operation related to the payment platform does not have to be performed based on the vehicle travel history even when the driving vehicle approaches any exit of the toll road. In other words, the asset transfer operation related to the payment platform can be performed based on the vehicle travel history each time the traveled distance of the driving vehicle on the toll road reaches the predetermined distance and the driving vehicle approaches any exit of the toll road, so as to charge the asset corresponding to the traveled distance.

In an implementation, a value of the predetermined distance can be set based on needs, for example, 1 km, 300 m, 100 m, or 1 m. The predetermined distance is set as small as possible, for example, 1 m, and even a similar effect and feeling of "real-time charging" can be generated, so that the toll of the driving vehicle can be calculated and charged more accurately.

In an implementation, the toll can dynamically change. For example, a toll within 1 km is RMB 0, and a toll over 1 km is 1 RMB/km. Therefore, a total traveled distance of the driving vehicle on the toll road can be counted. Then, the asset transfer operation related to the payment platform is performed based on a charging criterion corresponding to a distance range within which the total traveled distance falls.

In an implementation, in the present specification, because the tolling system can automatically charge a toll for a vehicle driving on the toll road, no blocking facility needs be disposed at an exit of the toll road, so that the vehicle can smoothly drive away without stopping. However, it needs to be ensured that a toll can be automatically charged by the tolling system for each vehicle entering the toll road; otherwise, some tolls may be neglected. Therefore, when any vehicle drives to an entrance of the toll road, a query request can be initiated to the payment platform based on vehicle information of the any vehicle. When it is determined that a user account corresponding to the vehicle information of the any vehicle exists on the payment platform, it indicates that the tolling system can automatically charge a toll for the any vehicle based on the present specification, and therefore, can allow the any vehicle to pass, so that the any vehicle enters the toll road; otherwise, the tolling system refuses the any vehicle to pass.

Figure 4:
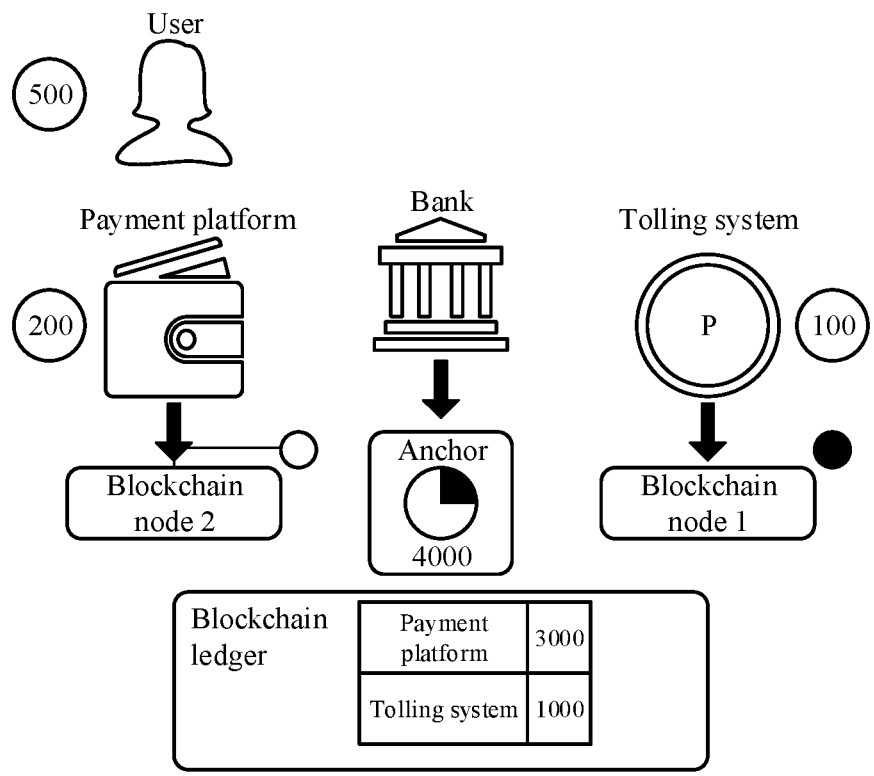
FIG. 4 is a schematic diagram illustrating a toll road automatic charging scenario, according to an example implementation.

For ease of understanding, technical solutions of one or more implementations of the present specification are described by using "toll road automatic charging" as an example. FIG. 4 is a schematic diagram illustrating a toll road automatic charging scenario, according to an example implementation. As shown in FIG. 4, assume that a tolling system is configured, and the tolling system creates account 1 on a payment platform. For example, a balance of account 1 in FIG. 4 is RMB 100. A user can also create account 2 on the payment platform. For example, a balance of account 2 in FIG. 4 is RMB 500. The payment platform can also create an account of the payment platform. For example, a balance of the account of the payment platform is RMB 200 in FIG. 4. Both the tolling system and the payment platform can be blockchain members (or referred to as members) in a blockchain network. For example, the tolling system corresponds to blockchain node 1 in the blockchain network, and the payment platform corresponds to blockchain node 2 in the blockchain network, so that the tolling system and the payment platform can perform operations such as asset transfer in the blockchain network based on blockchain nodes 1 and 2, respectively. Blockchain nodes in the blockchain network can include an anchor in addition the previous blockchain members. A role of the anchor can be assumed by a blockchain member, or the anchor can be unrelated to a blockchain member. In other words, the role of the anchor does not have to be assumed by a blockchain member. For example, in the implementation shown in FIG. 4, a bank can assume the role of the anchor, and the bank may be a blockchain member, or does not have to be a blockchain member.

The anchor is configured to anchor a blockchain asset in the blockchain network to an offchain asset outside the blockchain network, so that an offchain asset can be converted into an equivalent blockchain asset by using the anchor, or a blockchain asset can be converted into an equivalent offchain asset by using the anchor, thereby implementing one-to-one mapping between blockchain assets and offchain assets. In addition, the anchor can register, in a blockchain ledger in the blockchain network, a blockchain asset (or referred to as a blockchain balance) deposited by each blockchain member in the anchor, so as to maintain a holding status of each blockchain member for the blockchain asset. For example, in the implementation shown in FIG. 4, assume that a blockchain asset that the tolling system registers with the anchor by using blockchain node 1 is RMB 1000, and a blockchain asset that the payment platform registers with the anchor by using blockchain node 2 is RMB 3000.

Figure 5:
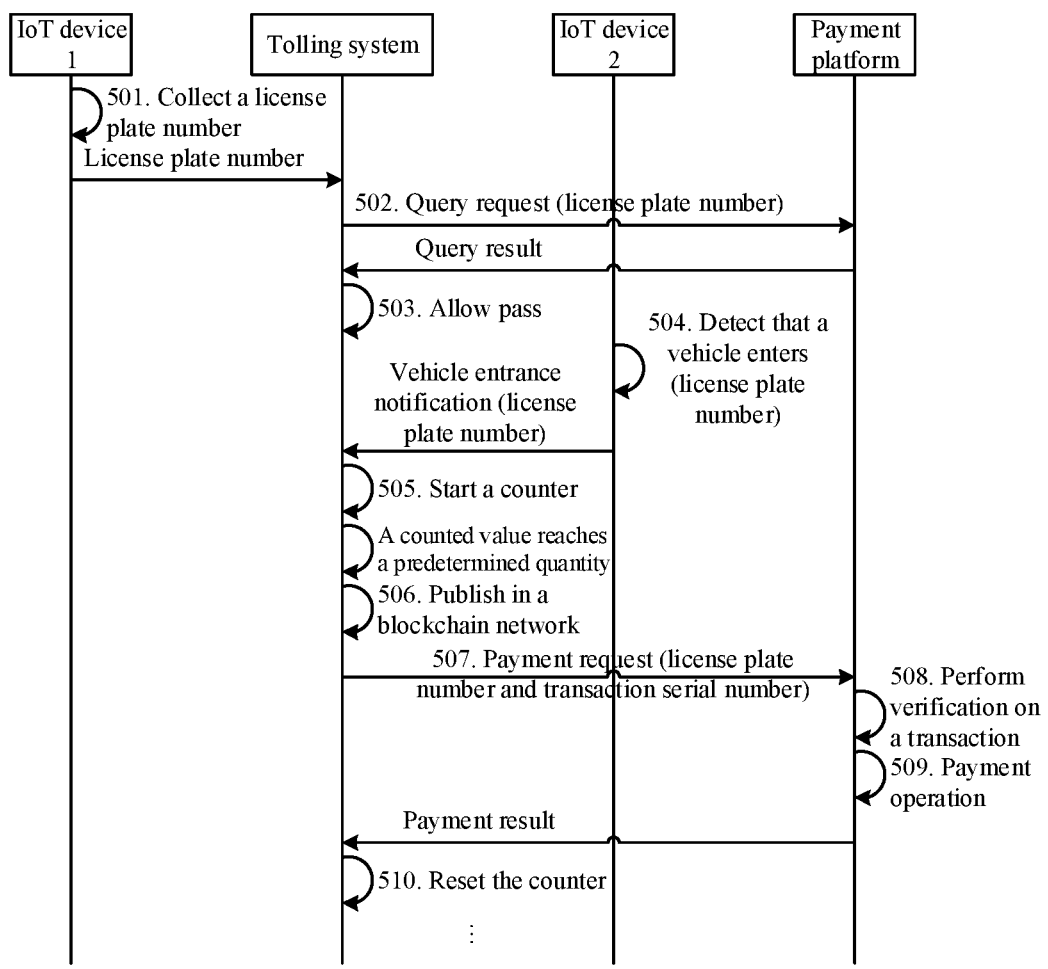
FIG. 5 is a schematic interaction diagram illustrating toll road automatic charging, according to example implementation 1.

For the scenario shown in FIG. 4, FIG. 5 is a schematic interaction diagram illustrating toll road automatic charging, according to example implementation 1. As shown in FIG. 5, assume that the previously described tolling system and several IoT devices 1 and several IoT devices 2 that are associated with the tolling system are configured on a toll road. The tolling system can automatically charge a toll based on detection data of IoT device 1 and IoT device 2 in cooperation with a payment platform. The interaction process of the toll road automatic charging can include the following steps.

Step 501: IoT device 1 collects a license plate number, and sends the license plate number to the tolling system.

In an implementation, assume that IoT device 1 is disposed at an entrance of the toll road, and is configured to detect vehicle information of a vehicle that wants to enter the toll road. For example, the vehicle information can include a license plate number. There may be several entrances on the toll road, and corresponding IoT device 1 can be disposed at each entrance.

In an implementation, IoT device 1 can include any electronic device capable of collecting vehicle information of a vehicle. A license plate number is used as an example. For example, IoT device 1 can be an image collection device, and an image collected by the image collection device for a vehicle can be used to identify the license plate number. For another example, IoT device 1 can be an RFID reader, the RFID reader can read an RFID signal transmitted by an RFID tag installed on a vehicle, and the RFID signal can include a license plate number of the corresponding vehicle.

In an implementation, IoT device 1 can use vehicle information of other types other than the license plate number, or combine the license plate number with vehicle information of other types, so as to reduce possible abnormal situations of vehicles, for example, "vehicle cloning", and prevent a loss to a cloned vehicle.

Step 502: The tolling system sends a query request to the payment platform, where the query request includes the license plate number of the vehicle, and receives a query result returned by the payment platform.

Step 503: When the query result is that a user account corresponding to the license plate number exists on the payment platform, allow the corresponding vehicle to pass, so that the vehicle enters the toll road.

In an implementation, a driver of the vehicle or another associated user needs to preset a corresponding user account on the payment platform, and binds the user account to the license plate number of the vehicle, etc. Based on a binding relationship between the user account and the license plate number, the payment platform can detect the license plate number provided by the tolling system to determine whether the corresponding user account exists. For example, when the license plate number is "ABC123", assuming that the payment platform can identify that the bound user account is account 1, the payment platform can return a query result of "an account is bound"; or assuming that the payment platform does not identify a bound user account, the payment platform can return a query result of "no account is bound".

In an implementation, in the present specification, a toll of a vehicle is automatically charged by the tolling system. Therefore, no blocking apparatus such as a parking barrier needs to be disposed at an exit of the toll road, so that the vehicle can drive away from the toll road directly and smoothly without staying at the exit for payment, etc. Therefore, through steps 501 to 503, before a vehicle enters the toll road, it can be determined that the vehicle has a corresponding user account on the payment platform, so as to ensure that the vehicle can support the technical solution of the present specification and that the tolling system can automatically charge a toll based on the user account. A vehicle that cannot support the technical solution of the present specification should be prohibited from passing because a toll cannot be charged for the related vehicle by the tolling system and the vehicle cannot stay at the exit for payment. Therefore, the toll cannot be successfully charged.

Step 504: After detecting that the vehicle enters a toll road section monitored by IoT device 2, IoT device 2 sends a corresponding vehicle entrance notification to the tolling system, where the vehicle entrance notification includes the license plate number of the related vehicle obtained by IoT device 2.

In an implementation, IoT device 2 can include any electronic device capable of detecting that a vehicle enters a corresponding toll road section and obtaining a license plate number of the vehicle. Implementations are not limited in the present specification.

In an implementation, IoT device 2 can be a monitoring device. The monitoring device can monitor one or more sections of the toll road. The monitoring device can analyze whether a vehicle enters a corresponding toll road section by using a monitoring image, and analyze a license plate number of the vehicle from the monitoring image.

In an implementation, IoT device 2 can be an RFID reader. One RFID reader can be disposed for each section of the toll road, and a valid reading range of the RFID reader does not go beyond the corresponding toll road section. Therefore, when a vehicle enters a toll road section, only an RFID reader disposed at the toll road section can activate an RFID tag on the vehicle. In this case, it can be detected that the vehicle enters the toll road section. In addition, the RFID reader can read an RFID signal transmitted by the RFID tag, and the RFID signal can include a license plate number of the vehicle on which the RFID tag is located.

The "activating an RFID tag" refers to the situation that the RFID tag is of a passive type. In other situations, the RFID tag on the vehicle can be of an active type, so that the RFID tag can actively transmit the RFID signal without being "activated". Transmit power of the RFID tag is limited and a transmit range of the RFID signal is controlled, so that the RFID reader can also determine that the vehicle enters the corresponding toll road section based on the received RFID signal and determine the license plate number of the vehicle that has entered.

In an implementation, whether a vehicle enters a corresponding toll road section can be identified and vehicle information of the vehicle can be obtained only by using IoT device 2, so that the tolling system can further automatically charge a toll based on a vehicle entrance notification sent by IoT device 2. However, in some situations, "identifying whether a vehicle enters a corresponding toll road section" and "obtaining vehicle information of the vehicle" can be completed by different IoT devices, so as to reduce requirements on aspects such as performance for each IoT device.

In an implementation, IoT device A can "identify whether a vehicle enters a corresponding toll road section" and IoT device B can "obtain vehicle information of the vehicle". When detecting that a vehicle enters a corresponding toll road section, IoT device A sends a vehicle entrance notification to the tolling system. The tolling system sends a vehicle information request to IoT device B, and IoT device B collects a license plate number and notifies the tolling system of the license plate number.

In an implementation, IoT device A can include any IoT device capable of sensing a vehicle entering a corresponding toll road section. Implementations are not limited in the present specification. In an implementation, IoT device A can include an underground induction coil, and the underground induction coil can be installed under the ground of the corresponding toll road section or at another location, so that the vehicle entering the toll road section can trigger the underground induction coil. In an implementation, IoT device A can include a ranging device, the ranging device can be installed above the corresponding toll road section or at another location for ranging toward the ground, and the vehicle entering the toll road section can trigger a change of a ranging result of the ranging device. In an implementation, IoT device A can include an infrared detection device, the infrared detection device can be installed above or in front of the corresponding toll road section or at another location, and the vehicle entering the toll road section can trigger the infrared detection device to generate a predetermined infrared detection result. In an implementation, IoT device A can include a monitoring device. The monitoring device can monitor one or more toll road sections of the toll road. The monitoring device can analyze whether a vehicle enters a toll road section by using a monitoring image.

In an implementation, IoT device B can include any electronic device capable of obtaining a license plate number of a vehicle entering a corresponding toll road section. Implementations are not limited in the present specification. In an implementation, IoT device B can be a monitoring device. The monitoring device can monitor at least some toll road sections monitored by IoT device A. The monitoring device can identify a license plate number of a vehicle through analysis on a monitoring image. In an implementation, IoT device B can be an RFID reader. A signal transceiving range of the RFID reader can cover at least some toll road sections monitored by IoT device A, so that when IoT device A detects a vehicle entering a corresponding toll road section, the RFID reader can receive an RFID signal sent by an RFID tag installed on the vehicle, and read a license plate number of the vehicle included in the RFID signal.

Step 505: The tolling system starts a counter to record a traveled distance of the related vehicle based on the vehicle entrance notification sent by IoT device 2.

In an implementation, assuming that a license plate number included in the vehicle entrance notification is "ABC123", the tolling system can start corresponding counter 1 for "ABC123", and counter 1 is dedicated to recording a traveled distance of the vehicle "ABC123".

In an implementation, IoT devices 2 can be disposed on the toll road at equal spacings, and a spacing between adjacent IoT devices 2 is known data. Therefore, by counting vehicle entrance notifications sent by the IoT devices 2 to the tolling system, a traveled distance of a corresponding vehicle can be calculated based on the spacing and a counted value. For example, when the spacing between adjacent IoT device 2 is 500 m, if the tolling system receives 10 vehicle entrance notifications, the traveled distance of the corresponding vehicle is 5 km.

Certainly, in some situations, adjacent IoT devices 2 can be disposed at unequal spacings. In this case, a vehicle entrance notification can include information such as a device identifier of IoT device 2 serving as a sending party, so that the tolling system can determine IoT device 2 corresponding to the vehicle entrance notification, and the tolling system can determine a traveled distance of a vehicle based on pre-recorded spacings between IoT devices 2.

Step 506: After the counter counts to a predetermined quantity, the tolling system publishes the traveled distance of the related vehicle to a blockchain network.

In an implementation, when the previously described counter-based technical solution is used, a corresponding predetermined distance can be indirectly set by setting the predetermined quantity, so that when the counter counts to the predetermined quantity, the traveled distance of the vehicle reaches the predetermined distance, and therefore, a driving process of the vehicle on the toll road is divided into several stages with a length of the predetermined distance, and a corresponding toll is paid in each stage through steps 506 to 509, etc. Certainly, even if the traveled distance of the vehicle is determined in another way, the predetermined distance can be set directly or indirectly, and the driving process of the vehicle on the toll road can be divided into several stages with a length of the predetermined distance, so that a corresponding toll is paid in each stage through steps 506 to 509, etc.

In an implementation, assume that a spacing between adjacent IoT devices 2 is 1 km, and the predetermined quantity is 8. When the counter counts to 8, it indicates that a traveled distance of a driving vehicle reaches 8 km. The tolling system can publish, to the blockchain network by using blockchain node 1, the situation that information about a traveled distance of a vehicle such as "ABC123" is 1 hour, so that the information about the traveled distance is recorded in a transaction record in a blockchain ledger. The transaction record can be uniquely mapped by using a corresponding transaction serial number, etc.

Step 507: The tolling system initiates a payment request to the payment platform, where the payment request includes the license plate number and a transaction serial number.

Step 508: The payment platform performs verification on a related transaction for the payment request.

Step 509: The payment platform triggers a payment operation.

In an implementation, the payment platform can identify that the bound user account is account 2 based on the license plate number "ABC123", so as to perform a payment operation for account 2.

In an implementation, the payment platform can identify a corresponding transaction record from the blockchain ledger by using blockchain node 2 based on the transaction serial number included in the payment request. It can be verified that the tolling system actually obtains the traveled distance of the vehicle "ABC123". In addition, a specific value of the traveled distance corresponding to the vehicle "ABC123" can be determined. A blockchain is resistant to modification to information and is traceable, so that information registered in the blockchain ledger has enough reliability, and can be trusted by each member and anchor, and therefore, can be used as the basis for performing a payment operation by the payment platform.

In an implementation, the payment request may not include a specific payment amount, and the payment platform calculates a corresponding payment amount based on the traveled distance recorded in the transaction record and a charging rule pre-agreed between the tolling system and the payment platform. For example, the traveled distance recorded in the transaction record is 8 km. If the charging rule is 1 RMB/km, the payment platform can calculate that a corresponding payment amount is RMB 8.

In an implementation, the payment request can include a specific payment amount. For example, the tolling system can calculate that the payment amount is RMB 8 based on the traveled distance "8 km" of the vehicle "ABC123" and a charging rule "1 RMB/km", and add a value of the payment amount to the payment request. In this case, the payment platform can determine, from the transaction record in the blockchain network, that the traveled distance of the vehicle "ABC123" is 8 km and the predefined charging rule is 1 RMB/km. Therefore, the payment platform calculates that the payment amount is RMB 8. In addition, the payment platform can read the payment amount "RMB 8" from the payment request. If the two are consistent, the payment operation can be successfully performed. Otherwise, the payment platform can refuse to perform the payment operation.

Figure 6:
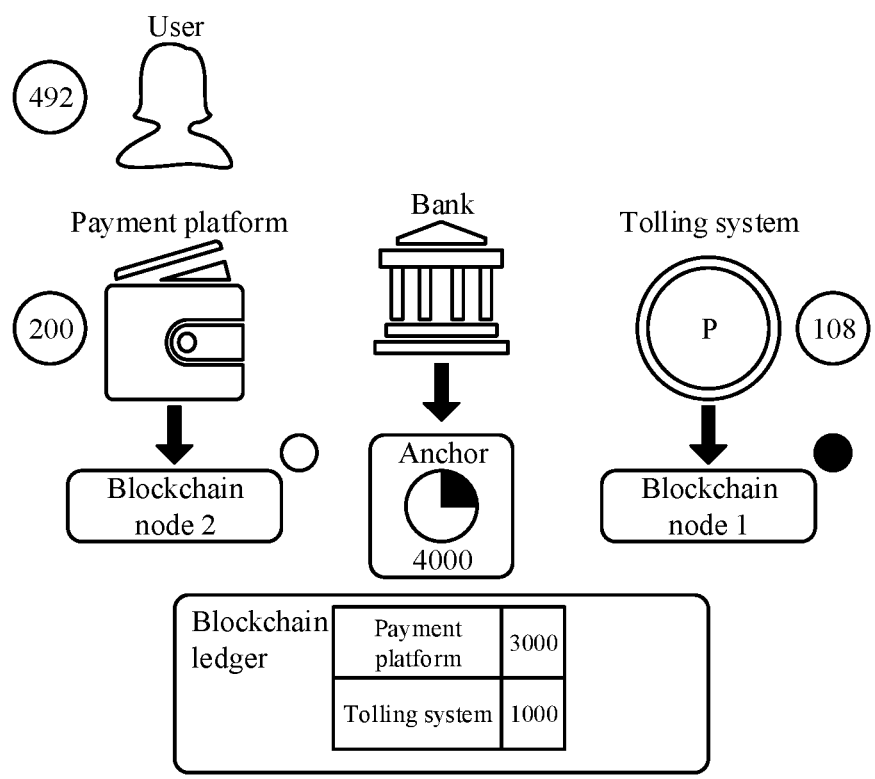
FIG. 6 is a schematic diagram illustrating a payment operation, according to an example implementation.

FIG. 6 is a schematic diagram illustrating a payment operation, according to an example implementation. As shown in FIG. 6, because the tolling system has corresponding account 1 on the payment platform, and the vehicle "ABC123" corresponds to account 2 on the payment platform, the payment platform can transfer an asset corresponding to the previously described payment amount from account 2 to account 1, so as to complete automatic charging of the toll. For example, when the payment amount is RMB 8, a balance of account 1 is increased from RMB 100 in FIG. 4 to RMB 108 in FIG. 6, and a balance of account 2 is decreased from RMB 500 in FIG. 4 to RMB 492 in FIG. 6.

Figure 7:
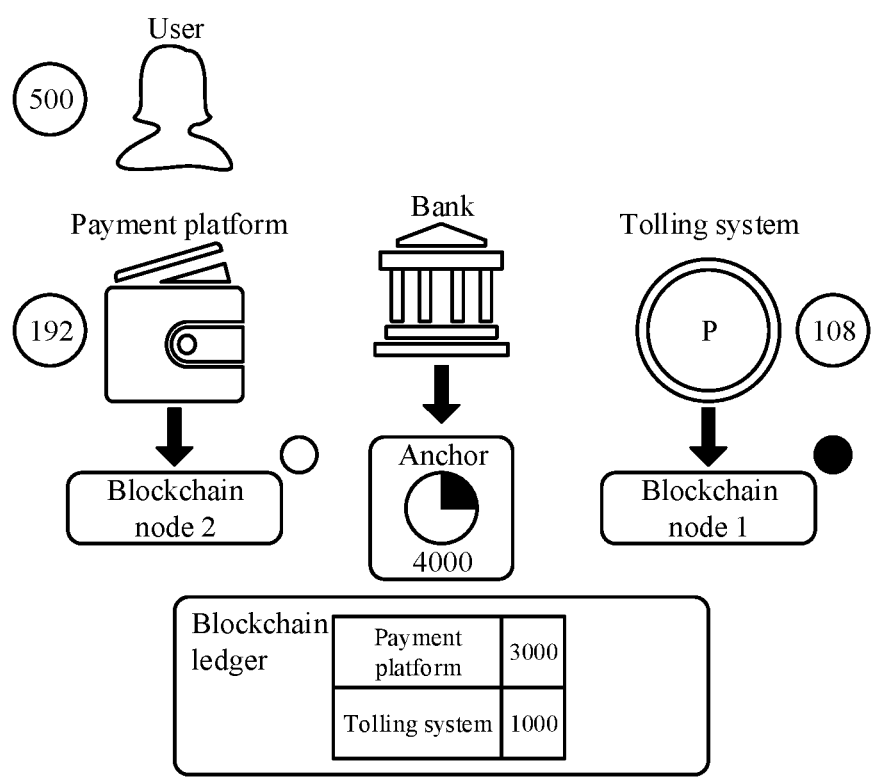
FIG. 7 is a schematic diagram illustrating another payment operation, according to an example implementation.

FIG. 7 is a schematic diagram illustrating another payment operation, according to an example implementation. As shown in FIG. 7, if account 2 has a limit of credit on the payment platform, and the remaining limit of credit is not less than the payment amount, the payment platform can transfer a fund corresponding to the payment amount from an account of the payment platform (or another account such as a credit dedicated account) to account 1, and deduct the payment amount from the limit of credit corresponding to account 2. In this case, even if remaining funds of account 2 are insufficient to pay the payment amount, the tolling system can still charge the corresponding toll. For example, when the payment amount is RMB 8, a balance of account 1 is increased from RMB 100 in FIG. 4 to RMB 108 in FIG. 7, a balance of account 2 remains unchanged at RMB 500, and a balance of the account of the payment platform is decreased from RMB 200 in FIG. 4 to RMB 192 in FIG. 7. Therefore, account 2 does not need to pay the toll of the vehicle "ABC123" immediately, but can return the payment amount advanced by the account of the payment platform after a certain period of time. In this case, even if account 2 may have insufficient funds due to various reasons, the toll can be paid based on the limit of credit of account 2 on the payment platform.

Figure 8:
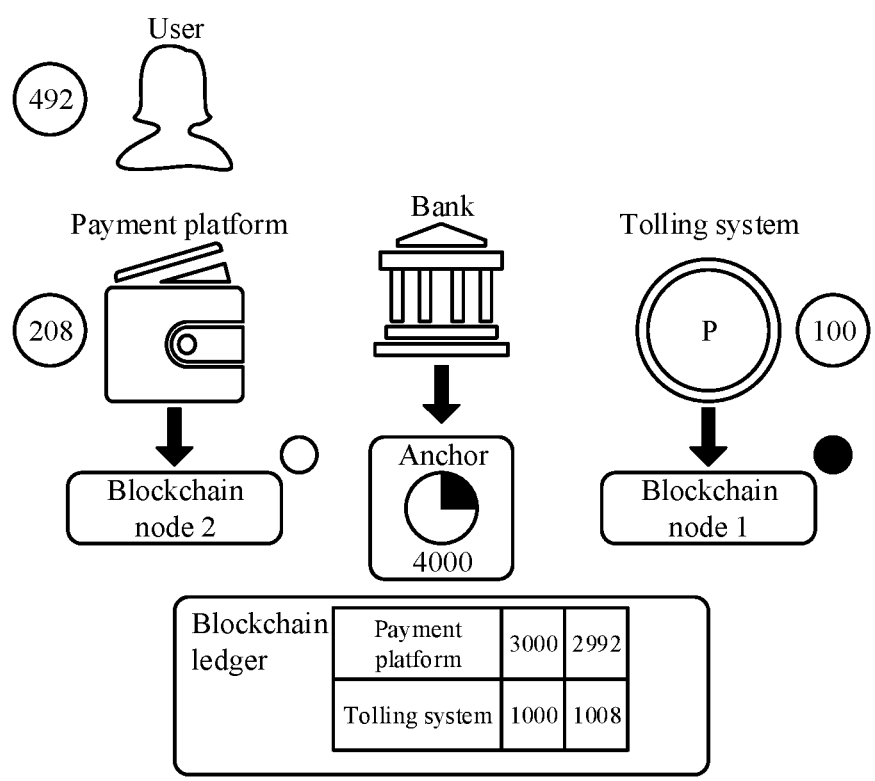
FIG. 8 is a schematic diagram illustrating still another payment operation, according to an example implementation.

In the implementations shown in FIG. 6 and FIG. 7, the toll payment operation is completed by transferring an offchain asset based on account 1, account 2, the account of the payment platform, etc. that are opened on the payment platform. In other implementations, the toll payment operation can be performed by transferring a blockchain asset. The following provides descriptions with reference to FIG. 8. As shown in FIG. 8, the payment platform first deducts an offchain asset corresponding to the payment amount from account 2 corresponding to the vehicle "ABC123", for example, transfers RMB 8 from account 2 to the account of the payment platform, so that a balance of account 2 is decreased from RMB 500 in FIG. 4 to RMB 492 in FIG. 8, and a balance of the account of the payment platform is increased from RMB 200 in FIG. 4 to RMB 208 in FIG. 8. Transfer is made from a blockchain asset deposited by the payment platform in an anchor to a blockchain asset deposited by the tolling system in the anchor. Assuming that a conversion ratio between a blockchain asset and an offchain asset is 1:1, RMB 8 is transferred from the blockchain asset corresponding to the payment platform to the blockchain asset corresponding to the tolling system, so that the blockchain asset corresponding to the payment platform is decreased from RMB 3000 in FIG. 4 to RMB 2992 in FIG. 8, and the blockchain asset corresponding to the tolling system is increased from RMB 1000 in FIG. 4 to RMB 1008 in FIG. 8. In this case, in view of the transfer of the offchain asset and the blockchain asset, the payment platform achieves a balance between the received offchain asset and the transferred blockchain asset, which is equivalent to the situation that account 2 corresponding to the vehicle "ABC123" pays the offchain asset corresponding to the payment amount and the tolling system receives the blockchain asset corresponding to the payment amount, thereby completing automatic charging of the toll.

Certainly, in the implementation shown in FIG. 8, the payment platform and the tolling system have blockchain assets at the same anchor, and a payment condition of the payment amount is satisfied. The payment condition can include the following: (1) The blockchain asset corresponding to the payment platform is not less than the payment amount, for example, 3000>8. (2) The tolling system presets a maximum asset limit for the anchor, and the sum (e.g., RMB 1008) of the payment amount and the blockchain asset of the tolling system is not greater than the maximum asset limit (e.g., RMB 3000). Therefore, the blockchain asset transfer operation can be successfully performed.

In other situations, for example, if the payment platform and the tolling system do not have blockchain assets at the same anchor, or the previously described payment condition cannot be satisfied although the payment platform and the tolling system have blockchain assets at the same anchor, relaying can be performed by using another blockchain member and anchor, so as to implement blockchain asset transfer. For example, assume that a blockchain asset deposited by the payment platform in anchor 1 is RMB 3000, a blockchain asset deposited by bank X in anchor 1 is RMB 1000, a maximum asset limit set by bank X for anchor 1 is RMB 1500, a blockchain asset deposited by bank X in anchor 2 is RMB 2000, a blockchain asset deposited by the tolling system in anchor 2 is RMB 1000, a maximum asset limit set by the tolling system for anchor 2 is RMB 2000, and there can also be other anchors, blockchain members, etc. In this case, when the payment amount is RMB 8, a blockchain asset transfer path "payment platform→bank X→tolling system" can be identified. Asset transfer is made from the blockchain asset RMB 3000 deposited by the payment platform in anchor 1 to the blockchain asset RMB 1000 deposited by bank X in anchor 1, and a transfer amount is a blockchain asset RMB 8 corresponding to the payment amount. In addition, asset transfer is made from the blockchain asset RMB 2000 deposited by bank X in anchor 2 to the blockchain asset RMB 1000 deposited by the tolling system in anchor 2, and a transfer amount is the blockchain asset RMB 8 corresponding to the payment amount. Therefore, the payment platform has transferred the blockchain asset RMB 8 corresponding to the payment amount to the tolling system. In addition to performing relaying by using the blockchain member "bank X", relaying can be performed by using more blockchain members. Details are omitted here for simplicity.

It is worthwhile to note that, when blockchain asset transfer is being made by using one or more relays, because blockchain nodes maintain blockchain ledgers with the same content, and the blockchain ledger records a blockchain asset deposited by each blockchain member in each anchor, adjustment to blockchain assets deposited by the blockchain members can be made in the blockchain network together. For example, in the previously described implementation, the blockchain asset deposited by the payment platform in anchor 1, the blockchain asset deposited by bank X in anchor 1, the blockchain asset deposited by bank X in anchor 2, and the blockchain asset deposited by the tolling system in anchor 2 are adjusted together, so that following situations occur at the same time: The blockchain asset deposited by the payment platform in anchor 1 is decreased by RMB 8, the blockchain asset deposited by bank X in anchor 1 is increased by RMB 8, the blockchain asset deposited by bank X in anchor 2 is decreased by RMB 8, and the blockchain asset deposited by the tolling system in anchor 2 is increased by RMB 8, so that asset transfer efficiency is significantly improved.

In an implementation, the payment operation shown in FIG. 8 is performed by the payment platform in step 509. Therefore, when blockchain asset transfer is involved, the payment platform can initiate a contract operation used for asset transfer in the blockchain network by using corresponding blockchain node 2 in the blockchain network, so that after the contract operation takes effect, the blockchain asset transfer is made.

Step 510: When a received payment result is that the payment succeeds, the tolling system controls the corresponding counter to reset.

In an implementation, after completing the payment operation, the payment platform returns the corresponding payment result to the tolling system. Assuming that the payment result indicates that the toll is successfully charged for the vehicle whose license plate number is "ABC123", and the tolling system can reset counter 1 corresponding to "ABC123", so that the tolling system recounts the traveled distance of the vehicle "ABC123".

Therefore, in the process that the vehicle drives on the toll road, steps 505 to 510 can be repeatedly triggered, so that the tolling system cooperates with the payment platform, to charge the toll automatically, continually, and stage by stage until the vehicle drives away from the toll road.

In an implementation, in the process that the vehicle "ABC123" drives on the toll road, the tolling system has charged the corresponding toll in cooperation with the payment platform, and it has been verified in steps 501 to 503 that the vehicle "ABC123" can support the technical solution of the present specification. Therefore, when the vehicle "ABC123" drives away from the toll road, it is assumed by default that the toll is actually paid by the vehicle "ABC123". Therefore, the vehicle "ABC123" can directly drive away from the exit of the toll road and there is no need to dispose any facility that may impede or hinder the driving, for example, a railing, at the exit. Therefore, it is ensured that the vehicle "ABC123" can drive away from the exit of the toll road smoothly and without interruption, thereby enhancing user experience and maintaining driving safety and driving order on the toll road.

Figure 9:
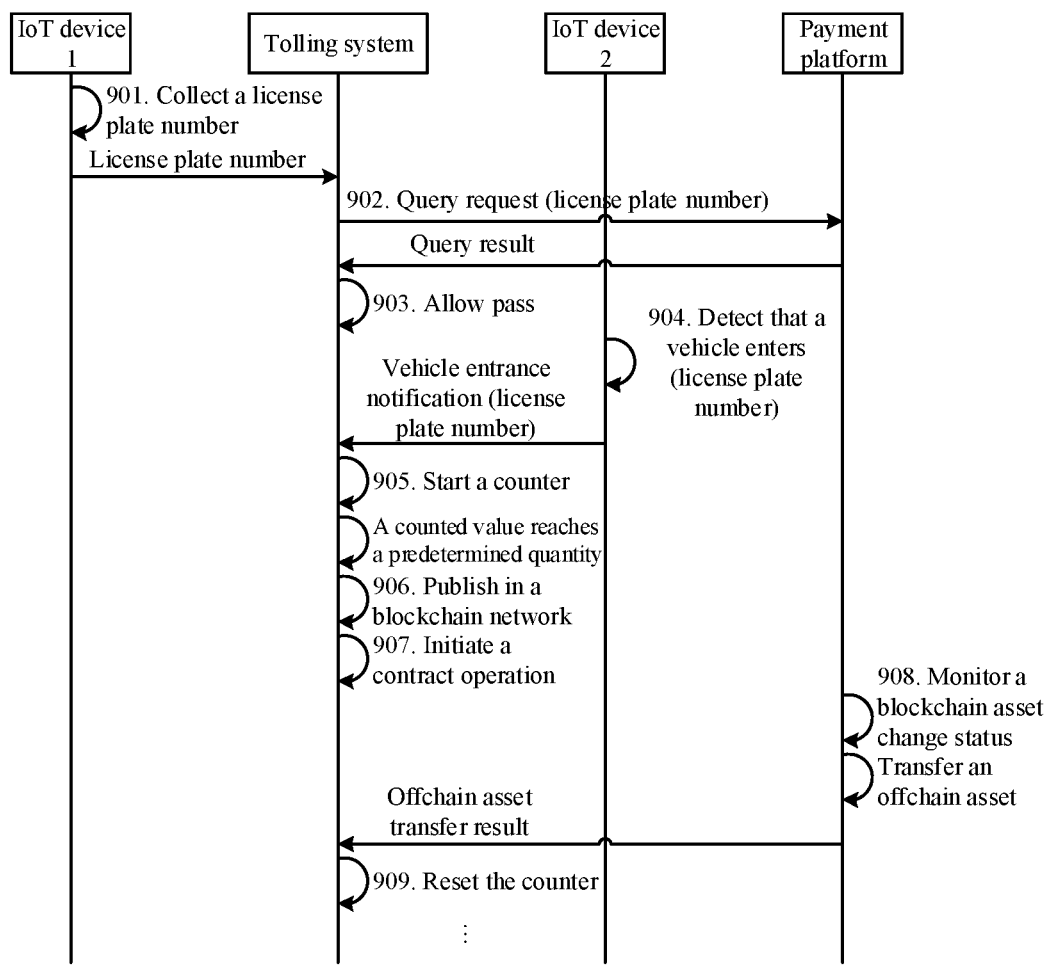
FIG. 9 is a schematic interaction diagram illustrating another type of toll road automatic charging, according to example implementation 1.

In the implementation shown in FIG. 5, the contract operation can be initiated by the payment platform in the blockchain network to complete the corresponding payment operation. In other implementations, the tolling system can further initiate the contract operation in the blockchain network. The following provides descriptions with reference to FIG. 9. FIG. 9 is a schematic interaction diagram illustrating another type of toll road automatic charging, according to example implementation 1. As shown in FIG. 9, assume that the previously described tolling system and IoT device 1 and IoT device 2 that are associated with the tolling system are configured on a toll road. The tolling system can automatically charge a toll based on detection data of IoT device 1 and IoT device 2 in cooperation with a payment platform. The interaction process of the toll road automatic charging can include the following steps.

Step 901: IoT device 1 collects a license plate number, and sends the license plate number to the tolling system.

Step 902: The tolling system sends a query request to the payment platform, where the query request includes the license plate number of the vehicle, and receives a query result returned by the payment platform.

Step 903: When the query result is that a user account corresponding to the license plate number exists on the payment platform, allow the corresponding vehicle to pass, so that the vehicle enters the toll road.

Step 904: After detecting that the vehicle enters a toll road section monitored by IoT device 2, IoT device 2 sends a corresponding vehicle entrance notification to the tolling system, where the vehicle entrance notification includes the license plate number of the related vehicle obtained by IoT device 2.

Step 905: The tolling system starts a counter to record a traveled distance of the related vehicle based on the vehicle entrance notification sent by IoT device 2.

Step 906: After the counter counts to a predetermined quantity, the tolling system publishes the traveled distance of the related vehicle to a blockchain network.

In an implementation, for steps 901 to 906, references can be made to steps 501 to 506 shown in FIG. 5. Details are omitted here for simplicity.

Step 907: The tolling system initiates a contract operation used for asset transfer, to automatically charge a toll.

In an implementation, blockchain node 1 corresponding to the tolling system in the blockchain network can initiate the contract operation used for asset transfer in the blockchain network, so that after the contract operation takes effect, the corresponding blockchain asset transfer is made.

For example, a state before the contract operation is shown in FIG. 4, and a state after the contract operation takes effect is shown in FIG. 8: RMB 8 is transferred from a blockchain asset corresponding to the payment platform to a blockchain asset corresponding to the tolling system, so that the blockchain asset corresponding to the payment platform is decreased from RMB 3000 in FIG. 4 to RMB 2992 in FIG. 8, and the blockchain asset corresponding to the tolling system is increased from RMB 1000 in FIG. 4 to RMB 1008 in FIG. 8.

Similar to the previously described blockchain asset transfer in step 509, the blockchain asset transfer between the payment platform and the tolling system can be directly made based on the same anchor (as shown in FIG. 8) or can be made through relaying based on multiple anchors. Details are omitted here for simplicity.

Step 908: The payment platform performs an offchain asset transfer operation based on a monitored blockchain asset change status, and returns a corresponding offchain asset transfer result to the tolling system.

In an implementation, based on the contract operation initiated in step 907, a blockchain asset, for example, RMB 8, corresponding to the traveled distance is transferred from the blockchain asset of the payment platform to the blockchain asset of the tolling system. Correspondingly, the payment platform needs to charge an offchain asset corresponding to the traveled distance for the vehicle "ABC123", so that the payment platform achieves breakeven and complete automatic charging of the toll.

In an implementation, for example, as shown in FIG. 8, the payment platform can deduct an offchain asset corresponding to a payment amount from account 2 corresponding to the vehicle "ABC123", for example, transfer RMB 8 from account 2 to an account of the payment platform, so that a balance of account 2 is decreased from RMB 500 in FIG. 4 to RMB 492 in FIG. 8, and a balance of the account of the payment platform is increased from RMB 200 in FIG. 4 to RMB 208 in FIG. 8.

In an implementation, in the current charging process, the payment platform can deduct an offchain asset corresponding to a payment amount from account 2 corresponding to the vehicle "ABC123", which is equivalent to the situation that the toll is paid by account 2 corresponding to the vehicle "ABC123". In another implementation, when account 2 has a certain limit of credit on the payment platform, and the limit of credit is not less than a payment amount, the payment platform may temporarily not deduct an offchain asset corresponding to the payment amount from account 2, but deduct a credit asset corresponding to the payment amount from account 2, and directly return an offchain asset transfer result of "The transfer succeeds" to the tolling system. Subsequently, account 2 only needs to return a corresponding fund within a certain period of time, but does not need to pay in the current charging process, so that possible financial pressure of account 2 is alleviated.

Step 909: When a received offchain asset transfer result is that the payment succeeds, the tolling system controls the corresponding counter to reset.

In an implementation, in the process that the vehicle drives on the toll road, steps 905 to 909 can be repeatedly triggered, so that the tolling system cooperates with the payment platform, to charge the toll automatically, continually, and stage by stage until the vehicle drives away from the toll road.

Based on the implementation shown in FIG. 5 or FIG. 9, in the process that a vehicle drives on a toll road, the tolling system can cooperate with the payment platform to automatically charge a corresponding toll, so that after the vehicle drives away from the toll road, it is assumed by default that the toll has been paid by the vehicle. Therefore, the vehicle can directly drive away from an exit of the toll road, and there is no need to dispose any facility impeding or hindering the driving, for example, a railing, at the exit. Therefore, it is ensured that the vehicle can drive away from the exit of the toll road smoothly and without interruption. In addition to stage-based charging based on a traveled distance in the driving process, because a vehicle certainly needs to drive away from an exit of the toll road and the toll road usually has many exits, automatic payment of a toll can be triggered only when the vehicle approaches an exit and may drive away from the toll road, and normal departure of the vehicle is not affected. The following provides detailed descriptions with reference to FIG. 10 and FIG. 11.

Figure 10:
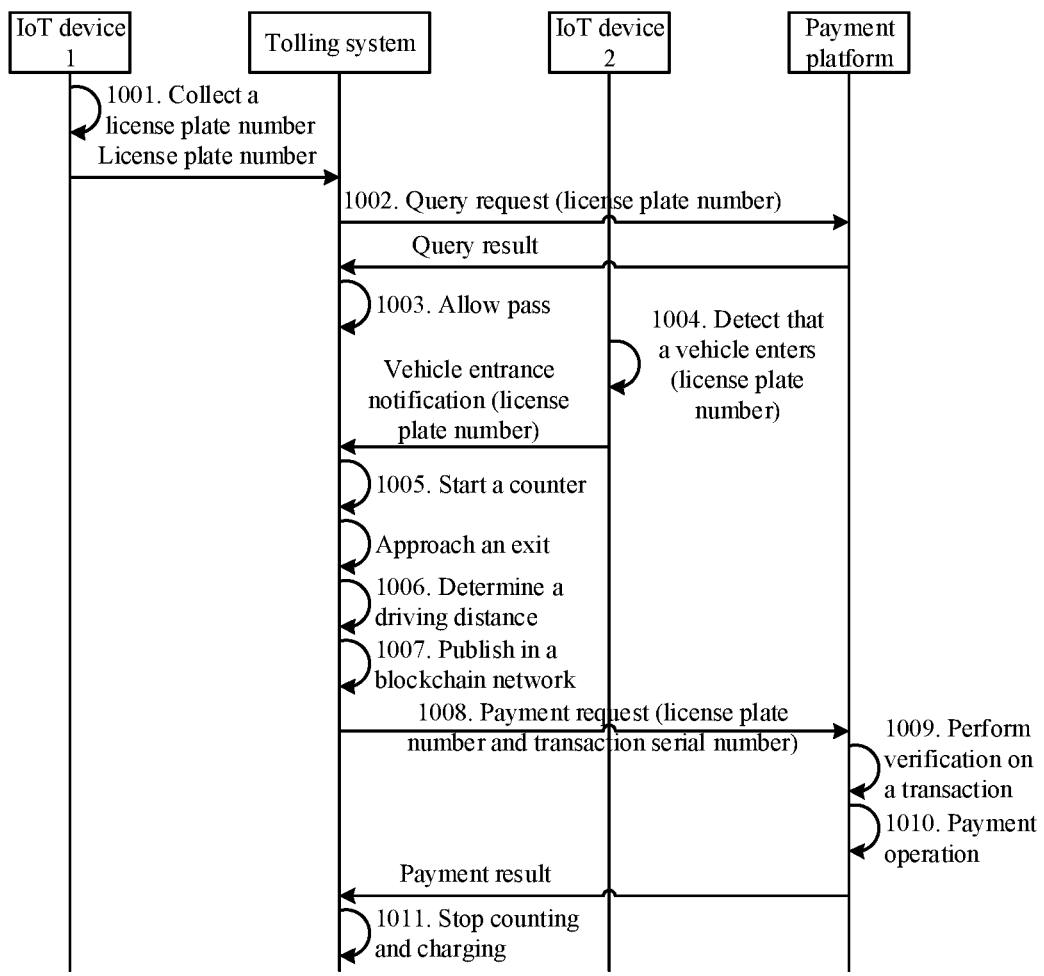
FIG. 10 is a schematic interaction diagram illustrating toll road automatic charging, according to example implementation 2.

FIG. 10 is a schematic interaction diagram illustrating toll road automatic charging, according to example implementation 2. As shown in FIG. 10, assume that a tolling system and IoT device 2 associated with the tolling system are configured on a toll road. The tolling system can automatically charge a toll based on detection data of IoT device 2 in cooperation with a payment platform. The interaction process of the toll road automatic charging can include the following steps.

Step 1001: IoT device 1 collects a license plate number, and sends the license plate number to the tolling system.

Step 1002: The tolling system sends a query request to the payment platform, where the query request includes the license plate number of the vehicle, and receives a query result returned by the payment platform.

Step 1003: When the query result is that a user account corresponding to the license plate number exists on the payment platform, allow the corresponding vehicle to pass, so that the vehicle enters the toll road.

Step 1004: After detecting that the vehicle enters a toll road section monitored by IoT device 2, IoT device 2 sends a corresponding vehicle entrance notification to the tolling system, where the vehicle entrance notification includes the license plate number of the related vehicle obtained by IoT device 2.

Step 1005: The tolling system starts a counter to record a traveled distance of the related vehicle based on the vehicle entrance notification sent by IoT device 2.

In an implementation, for steps 1001 to 1005, references can be made to steps 501 to 505 shown in FIG. 5. Details are omitted here for simplicity.

Step 1006: When it is determined that the vehicle approaches any exit of the toll road based on a location where IoT device 2 is disposed, the tolling system determines the traveled distance of the vehicle.

In an implementation, the tolling system can calculate a traveled distance of the vehicle "ABC123" based on a spacing between adjacent IoT devices 2 and a quantity of vehicle entrance notifications counted by counter 1.

Step 1007: The tolling system publishes the traveled distance of the related vehicle to a blockchain network.

Step 1008: The tolling system initiates a payment request to the payment platform, where the payment request includes the license plate number and a transaction serial number.

Step 1009: The payment platform performs verification on a related transaction for the payment request.

Step 1010: The payment platform triggers a payment operation.

In an implementation, for steps 1007 to 1010, references can be made to steps 506 to 509 shown in FIG. 5. Details are omitted here for simplicity.

In an implementation, assuming that a traveled distance is 20 km, and a charging rule is 1 RMB/km, a payment amount corresponding to the traveled distance is RMB 20. The process of automatically charging the toll of RMB 20 is similar to the process of charging the toll of RMB 8 in FIG. 5. Details are omitted here for simplicity.

Step 1011: The tolling system stops counting and charging for the traveled distance of the vehicle that has driven away.

In an implementation, assuming that a license plate number included in a vehicle departure notification received by the tolling system is "ABC123", the tolling system can terminate counter 1 corresponding to "ABC123", so as to stop charging the vehicle "ABC123".

In an implementation, if the vehicle "ABC123" does not drive away from the exit, but continues to drive on the toll road, the tolling system can continue to perform automatic charging for a subsequent traveled distance of the vehicle "ABC123" through steps 1005 to 1011, which does not affect toll charging.

In an implementation, if the vehicle "ABC123" actually drives away from the toll road from the exit, because the tolling system has charged the corresponding toll in cooperation with the payment platform, the vehicle "ABC123" can directly drive away from the exit of the toll road, and there is no need to dispose any facility that may impede or hinder the driving, for example, a railing, at the exit. Therefore, it is ensured that the vehicle "ABC123" can drive away from the exit of the toll road smoothly and without interruption, thereby enhancing user experience and maintaining driving safety and driving order on the toll road.

Figure 11:
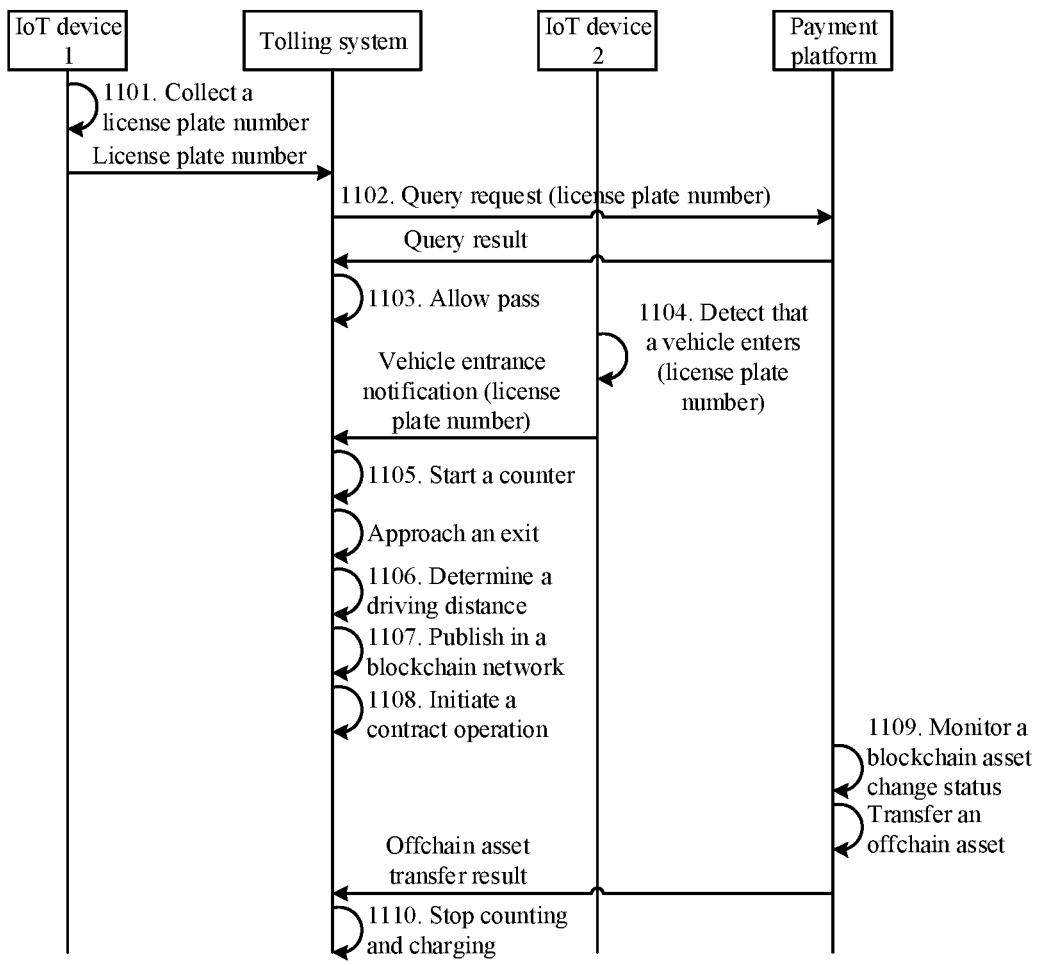
FIG. 11 is a schematic interaction diagram illustrating another type of toll road automatic charging, according to example implementation 2.

In the implementation shown in FIG. 10, a contract operation can be initiated by the payment platform in the blockchain network to complete the corresponding payment operation. In other implementations, the tolling system can further initiate the contract operation in the blockchain network. The following provides descriptions with reference to FIG. 11. FIG. 11 is a schematic interaction diagram illustrating another type of toll road automatic charging, according to example implementation 2. As shown in FIG. 11, assume that a tolling system and IoT device 2 associated with the tolling system are configured on a toll road. The tolling system can automatically charge a toll based on detection data of IoT device 2 in cooperation with a payment platform. The interaction process of the toll road automatic charging can include the following steps.

Step 1101: IoT device 1 collects a license plate number, and sends the license plate number to the tolling system.

Step 1102: The tolling system sends a query request to the payment platform, where the query request includes the license plate number of the vehicle, and receives a query result returned by the payment platform.

Step 1103: When the query result is that a user account corresponding to the license plate number exists on the payment platform, allow the corresponding vehicle to pass, so that the vehicle enters the toll road.

Step 1104: After detecting that the vehicle enters a toll road section monitored by IoT device 2, IoT device 2 sends a corresponding vehicle entrance notification to the tolling system, where the vehicle entrance notification includes the license plate number of the related vehicle obtained by IoT device 2.

Step 1105: The tolling system starts a counter to record a traveled distance of the related vehicle based on the vehicle entrance notification sent by IoT device 2.

Step 1106: When it is determined that the vehicle approaches any exit of the toll road based on a location where IoT device 2 is disposed, the tolling system determines the traveled distance of the vehicle.

Step 1107: The tolling system publishes the traveled distance of the related vehicle to a blockchain network.

In an implementation, for steps 1101 to 1107, references can be made to steps 1001 to 1007 shown in FIG. 10. Details are omitted here for simplicity.

Step 1108: The tolling system initiates a contract operation used for asset transfer, to automatically charge a toll.

Step 1109: The payment platform performs an offchain asset transfer operation based on a monitored blockchain asset change status, and returns a corresponding offchain asset transfer result to the tolling system.

In an implementation, for steps 1108 and 1109, references can be made to steps 907 and 908 shown in FIG. 9. Details are omitted here for simplicity.

Step 1110: When a received offchain asset transfer result is that the payment succeeds, the tolling system controls the corresponding counter to reset.

Figure 12:
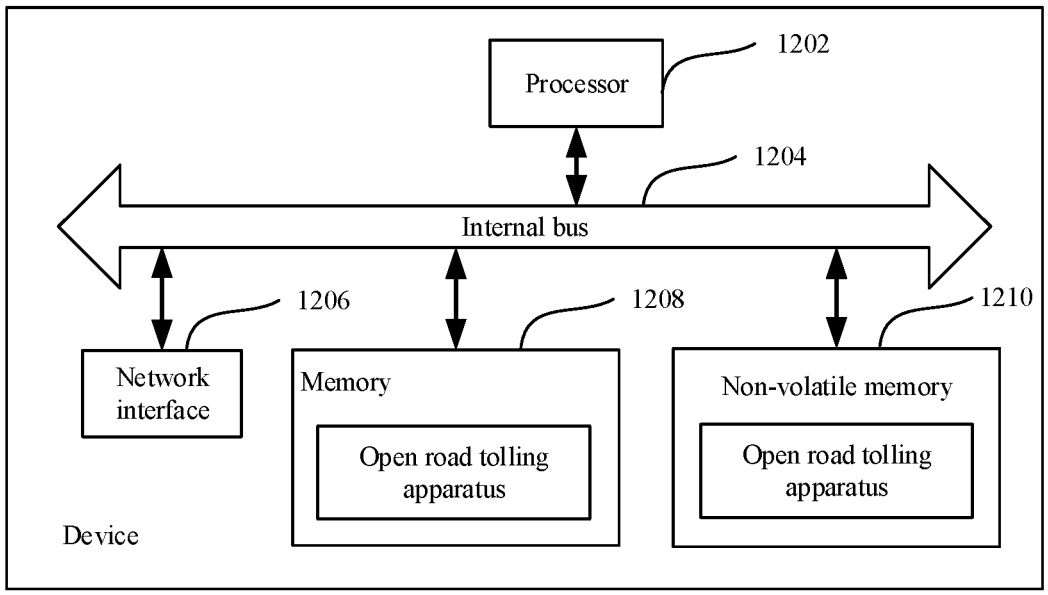
FIG. 12 is a schematic structural diagram illustrating a device, according to an example implementation.

FIG. 12 is a schematic structural diagram illustrating a device, according to an example implementation. As shown in FIG. 12, in terms of hardware, the device includes a processor 1202, an internal bus 1204, a network interface 1206, a memory 1208, and a non-volatile memory 1210, and certainly can further include other hardware needed by services. The processor 1202 reads a corresponding computer program from the non-volatile memory 1210 to the memory 1208 for running, so that an open road tolling apparatus is logically formed. Certainly, in addition to the software implementation, one or more implementations of the present specification do not exclude other implementations, for example, a logical device or a combination of hardware and software. In other words, an execution body of the following processing procedure is not limited to each logical unit, and can also be hardware or a logical device.

Figure 13:
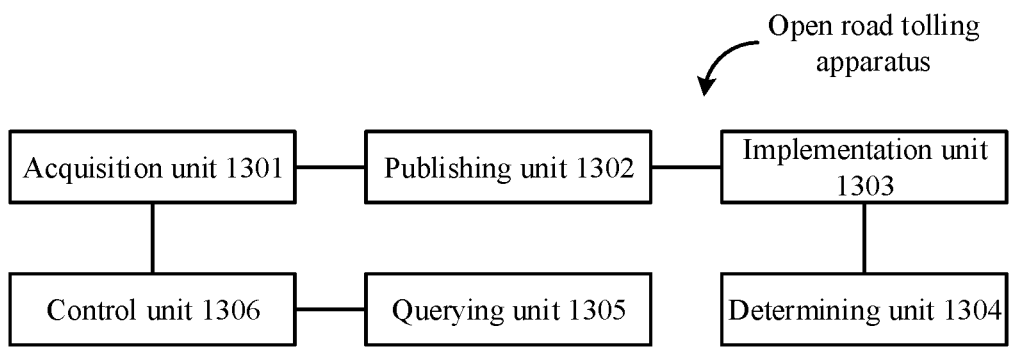
FIG. 13 is a block diagram illustrating an open road tolling apparatus, according to an example implementation.

In an implementation, as shown in FIG. 13, in a software implementation, the open road tolling apparatus is applied to a tolling system, and the apparatus can include the following: an acquisition unit 1301, configured to obtain vehicle information of a driving vehicle on a toll road, where the vehicle information has a corresponding user account on a payment platform; a publishing unit 1302, configured to publish a vehicle travel history to a blockchain network by using a first blockchain node corresponding to the tolling system in the blockchain network, where the vehicle travel history includes a traveled distance of the driving vehicle on the toll road; and an implementation unit 1303, configured to perform an asset transfer operation related to the payment platform based on the vehicle travel history each time the traveled distance of the driving vehicle on the toll road reaches a predetermined distance, so as to charge an asset corresponding to the predetermined distance.

Optionally, the acquisition unit 1301 is specifically configured to perform an information acquisition operation on a vehicle on a corresponding section of the toll road by using a first Internet of Things device associated with the tolling system; and determine the vehicle information of the driving vehicle based on information obtained by the first Internet of Things device.

Optionally, several first Internet of Things devices are separately installed at corresponding locations on the toll road, and a spacing between adjacent first Internet of Things devices is not greater than the predetermined distance; and the apparatus further includes the following: a determining unit 1304, configured to determine that the traveled distance of the driving vehicle reaches the predetermined distance when multiple first Internet of Things devices successively obtain the vehicle information of the driving vehicle and a total spacing between the multiple first Internet of Things devices is the predetermined distance.

Optionally, the first Internet of Things device includes at least one of the following: a monitoring device, an RFID reader, a Bluetooth device, an optical sensor, and a signal receiver.

Optionally, the acquisition unit 1301 is specifically configured to: when it is determined that there is a driving vehicle on the corresponding toll road section by using the first Internet of Things device, further perform an information acquisition operation on the driving vehicle by using the first Internet of Things device; or when it is determined that there is a driving vehicle on the corresponding toll road section by using a second Internet of Things device associated with the tolling system, further perform an information acquisition operation on the driving vehicle by using the first Internet of Things device.

Optionally, the implementation unit 1303 is specifically configured to: each time the traveled distance reaches the predetermined distance, initiate an asset charging request for the vehicle information to the payment platform, where the asset charging request includes an identifier of the vehicle travel history; and charge an asset transferred by the payment platform from the user account; or when a limit of credit of the user account is not exceeded, charge a credit asset related to the user account and transferred by the payment platform.

Optionally, the implementation unit 1303 is specifically configured to: each time the traveled distance reaches the predetermined distance, initiate a contract operation used for asset transfer by using the first blockchain node, where a validation condition of the contract operation includes that the traveled distance reaches the predetermined distance; and after the contract operation takes effect, receive, by using the first blockchain node, a blockchain asset corresponding to the predetermined distance and transferred by a second blockchain node corresponding to the payment platform in the blockchain network, where an offchain asset equivalent to the blockchain asset is deducted from the user account by the payment platform.

Optionally, the implementation unit 1303 is specifically configured to perform an asset transfer operation related to the payment platform based on the vehicle travel history each time the traveled distance of the driving vehicle on the toll road reaches the predetermined distance; and after the asset corresponding to the predetermined distance is charged, reset the traveled distance to recalculate the traveled distance.

Optionally, the apparatus further includes the following: a querying unit 1305, configured to: when any vehicle drives to an entrance of the toll road, initiate a query request to the payment platform based on vehicle information of the any vehicle; and a control unit 1306, configured to: when it is determined that a user account corresponding to the vehicle information of the any vehicle exists on the payment platform, allow the any vehicle to pass, so that the any vehicle enters the toll road; otherwise, refuse the any vehicle to pass.

Figure 14:
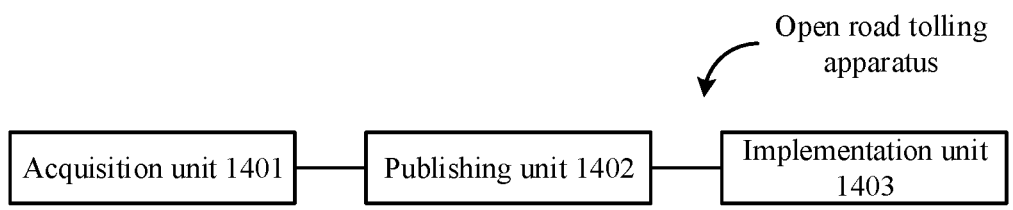
FIG. 14 is a block diagram illustrating another open road tolling apparatus, according to an example implementation.

In another implementation, as shown in FIG. 14, in a software implementation, the open road tolling apparatus is applied to a tolling system, and the apparatus can include the following: an acquisition unit 1401, configured to obtain vehicle information of a driving vehicle on a toll road, where the vehicle information has a corresponding user account on a payment platform; a publishing unit 1402, configured to publish a vehicle travel history to a blockchain network by using a first blockchain node corresponding to the tolling system in the blockchain network, where the vehicle travel history includes a traveled distance of the driving vehicle on the toll road; and an implementation unit 1403, configured to perform an asset transfer operation related to the payment platform based on the vehicle travel history each time the driving vehicle approaches any exit of the toll road, so as to charge an asset corresponding to the traveled distance.

Optionally, the implementation unit 1403 is specifically configured to: when the driving vehicle approaches the any exit of the road, initiate the asset charging request for the vehicle information to the payment platform; and after the asset corresponding to the traveled distance is charged, reset the traveled distance to recalculate the traveled distance.

The system, apparatus, module, or unit illustrated in the previous implementations can be specifically implemented by using a computer chip or an entity, or can be implemented by using a product having a certain function. A typical implementation device is a computer, and the computer can be specifically a personal computer, a laptop computer, a cellular phone, a camera phone, a smartphone, a personal digital assistant, a media player, a navigation device, an email receiving and sending device, a game console, a tablet, a wearable device, or any combination of these devices.

In a typical configuration, a computer includes one or more processors (CPU), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a magnetic disk storage, a quantum memory, a grapheme-based storage medium, or another magnetic storage device or any other non-transmission medium. The computer storage medium can be configured to store information that can be accessed by a computing device. Based on the definition in the present specification, the computer readable medium does not include transitory computer readable media (transitory media) such as a modulated data signal and carrier.

It is worthwhile to further note that, the terms "include", "comprise", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

Specific implementations of the present specification are described above. Other implementations fall within the scope of the appended claims. In some situations, the actions or steps described in the claims can be performed in an order different from the order in the implementation and the desired results can still be achieved. In addition, the process depicted in the accompanying drawings does not necessarily require a particular execution order to achieve the desired results. In some implementations, multi-tasking and parallel processing can be advantageous.

The term used in one or more implementations of the present specification is merely for the purpose of describing a particular implementation and is not intended to limit one or more implementations of the present specification. The terms "a" and "the" of singular forms used in one or more implementations of the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", third, etc. may be used in one or more implementations of the present specification to describe various types of information, the information is not limited to the terms. These terms are only used to differentiate between information of the same type. For example, without departing from the scope of one or more implementations of the present specification, first information can also be referred to as second information, and similarly, the second information can be referred to as the first information. Depending on the context, for example, the word "if" used here can be explained as "while", "when", or "in response to determining".

The previous descriptions are only example implementations of the one or more implementations of the present specification, but are not intended to limit one or more implementations of the present specification. Any modification, equivalent replacement, improvement, etc. made without departing from the spirit and principle of the one or more implementations of the present specification shall fall within the protection scope of the one or more implementations of the present specification.

What is claimed is:

1. A computer-implemented method for toll fee charging performed by a tolling system, the method comprising:
    monitoring one or more sections of a toll road by using one or more sensors of a first Internet of things (IoT) device of at least two IoT devices installed on the toll road to obtain monitoring data;
    determining, by a first IoT device, that a vehicle has entered a first section of the one or more sections of the toll road by analyzing the monitoring data;
    in response to determining that the vehicle has entered the first section of the toll road:
        detecting, by a second IoT device of the at least two IoT devices installed on a second section of road located at least some non-zero distance in a direction of travel from the first section, that the vehicle has traveled a distance that is equal to or greater than a distance between the first IoT device and the second IoT device;
        obtaining, by the first IoT device, information of the vehicle associated with a user account on a payment platform;
        and sending, by the first IoT device, a notification to the tolling system based on the monitoring data;
    recording, for the vehicle and to a blockchain associated with the payment platform, a travel history of the vehicle by using a blockchain node corresponding to the tolling system in a blockchain network, wherein the travel history comprises the distance traveled by the vehicle on the toll road;
    in response to determining that the distance reaches a predetermined distance, initiating a charging request of the vehicle to the payment platform, wherein the charging request comprises a unique identifier of vehicle travel history enabling the payment platform to search a blockchain ledger based on the unique identifier to determine authenticity and validity of the vehicle travel history, in response to verifying the vehicle travel history, determining, by an anchor node of the blockchain network associated with the tolling system, a toll fee corresponding to the predetermined distance;
    determining, by the anchor node, a first blockchain asset equivalent in value to the toll fee is less than or equal to a second blockchain asset of the user account on the payment platform;
    and transferring, by the anchor node, the first blockchain asset from the user account to a blockchain account of the tolling system.

2. The computer-implemented method of claim 1, wherein an IoT device of the at least two IoT devices further comprises at least one of a monitoring device, a radio frequency identifier (RFID) reader, a Bluetooth device, or a signal receiver.

3. The computer-implemented method of claim 1, wherein the toll fee is paid for by a credit payment from the user account corresponding to the vehicle when a credit limit of the user account is not exceeded.

4. The computer-implemented method of claim 1, wherein charging the user account comprises:
    performing a smart contract operation for transferring a blockchain asset corresponding to the toll fee from a blockchain node corresponding to the payment platform to the blockchain node corresponding to the tolling system, wherein a validation condition of the smart contract operation is that the distance reaches the predetermined distance.

5. The computer-implemented method of claim 1, further comprising:
    after collecting a micropayment, resetting a distance for determining whether the vehicle is driven for the predetermined distance.

6. The computer-implemented method of claim 1, further comprising: automatically allowing drive-through of the vehicle of a tollgate on the toll road in response to determining that the user account corresponding to the vehicle exists on the payment platform.

7. The computer-implemented method of claim 1, wherein the anchor node is configured to implement a one-to-one mapping between blockchain assets and offchain assets.

8. A computer-implemented tolling system for toll fee charging, comprising:
    one or more computers;
    and one or more computer memory devices interoperably coupled with the one or more computers and having tangible, non-transitory, machine-readable media storing one or more instructions that, when executed by the one or more computers, perform operations comprising:

monitoring one or more sections of a toll road by using one or more sensors of a first Internet of things (IoT) device of at least two IoT devices installed on the toll road to obtain monitoring data;

determining, by a first IoT device, that a vehicle has entered a first section of the one or more sections of the toll road by analyzing the monitoring data;

in response to determining that the vehicle has entered the first section of the toll road:

detecting, by a second IoT device of the at least two IoT devices installed on a second section of road located at least some non-zero distance in a direction of travel from the first section, that the vehicle has traveled a distance that is equal to or greater than a distance between the first IoT device and the second IoT device;

obtaining, by the first IoT device, information of the vehicle associated with a user account on a payment platform;

and sending, by the first IoT device, a notification to the tolling system based on the monitoring data;

recording, for the vehicle and to a blockchain associated with the payment platform, a travel history of the vehicle by using a blockchain node corresponding to the tolling system in a blockchain network, wherein the travel history comprises the distance traveled by the vehicle on the toll road;

in response to determining that the distance reaches a predetermined distance, initiating a charging request of the vehicle to the payment platform, wherein the charging request comprises a unique identifier of vehicle travel history enabling the payment platform to search a blockchain ledger based on the unique identifier to determine authenticity and validity of the vehicle travel history;

in response to verifying the vehicle travel history, determining, by an anchor node of the blockchain network associated with the tolling system, a toll fee corresponding to the predetermined distance;

determining, by the anchor node, a first blockchain asset equivalent in value to the toll fee is less than or equal to a second blockchain asset of the user account on the payment platform;

and transferring, by the anchor node, the first blockchain asset from the user account to a blockchain account of the tolling system.

9. The computer-implemented system of claim 8, wherein an IoT device of the at least two IoT devices further comprises at least one of a monitoring device, a radio frequency identifier (RFID) reader, a Bluetooth device, or a signal receiver.

10. The computer-implemented system of claim 8, wherein the toll fee is paid for by a credit payment from the user account corresponding to the vehicle when a credit limit of the user account is not exceeded.

11. The computer-implemented system of claim 8, wherein charging the user account comprises:

performing a smart contract operation for transferring a blockchain asset corresponding to the toll fee from a blockchain node corresponding to the payment platform to the blockchain node corresponding to the tolling system, wherein a validation condition of the smart contract operation is that the distance reaches the predetermined distance.

12. The computer-implemented system of claim 8, further comprising:

after collecting a micropayment, resetting a distance for determining whether the vehicle is driven for the predetermined distance.

13. The computer-implemented system of claim 8, further comprising: automatically allowing drive-through of the vehicle of a tollgate on the toll road in response to determining that the user account corresponding to the vehicle exists on the payment platform.

14. The computer-implemented tolling system of claim 8, wherein the anchor node is configured to implement a one-to-one mapping between blockchain assets and offchain assets.

15. A non-transitory, computer-readable medium storing one or more instructions executable by a computer-based tolling system to perform operations for toll fee charging, comprising:

monitoring one or more sections of a toll road by using one or more sensors of a first Internet of things (IoT) device of at least two IoT devices installed on the toll road to obtain monitoring data;

determining, by a first IoT device, that a vehicle has entered a first section of the one or more sections of the toll road by analyzing the monitoring data;

in response to determining that the vehicle has entered the first section of the toll road:

detecting, by a second IoT device of the at least two IoT devices installed on a second section of road located at least some non-zero distance in a direction of travel from the first section, that the vehicle has traveled a distance that is equal to or greater than a distance between the first IoT device and the second IoT device;

obtaining, by the first IoT device, information of the vehicle associated with a user account on a payment platform;

and sending, by the first IoT device, a notification to the tolling system based on the monitoring data;

recording, for the vehicle and to a blockchain associated with the payment platform, a travel history of the vehicle by using a blockchain node corresponding to the tolling system in a blockchain network, wherein the travel history comprises the distance traveled by the vehicle on the toll road;

in response to determining that the distance reaches a predetermined distance, initiating a charging request of the vehicle to the payment platform, wherein the charging request comprises a unique identifier of vehicle travel history enabling the payment platform to search a blockchain ledger based on the unique identifier to determine authenticity and validity of the vehicle travel history;

in response to verifying the vehicle travel history, determining, by an anchor node of the blockchain network associated with the tolling system, a toll fee corresponding to the predetermined distance;

determining, by the anchor node, a first blockchain asset equivalent in value to the toll fee is less than or equal to a second blockchain asset of the user account on the payment platform;

and transferring, by the anchor node, the first blockchain asset from the user account to a blockchain account of the tolling system.

16. The non-transitory, computer-readable medium of claim 15, wherein an IoT device of the at least two IoT devices further comprises at least one of a monitoring device, a radio frequency identifier (RFID) reader, a Bluetooth device, or a signal receiver.

17. The non-transitory, computer-readable medium of claim 15, wherein the toll fee is paid for by a credit payment from the user account corresponding to the vehicle when a credit limit of the user account is not exceeded.

18. The non-transitory, computer-readable medium of claim 15, wherein charging the user account comprises:
   performing a smart contract operation for transferring a blockchain asset corresponding to the toll fee from a blockchain node corresponding to the payment platform to the blockchain node corresponding to the tolling system, wherein a validation condition of the smart contract operation is that the distance reaches the predetermined distance.

19. The non-transitory, computer-readable medium of claim 15, further comprising:
   after collecting a micropayment, resetting a distance for determining whether the vehicle is driven for the predetermined distance.

20. The non-transitory, computer-readable medium of claim 15, further comprising:
   automatically allowing drive-through of the vehicle of a tollgate on the toll road in response to determining that the user account corresponding to the vehicle exists on the payment platform.

21. The non-transitory, computer-readable medium of claim 15, wherein the anchor node is configured to implement a one-to-one mapping between blockchain assets and offchain assets.

* * * * *

UNITED STATES PATENT AND TRADEMARK OFFICE
CERTIFICATE OF CORRECTION

PATENT NO. : 11,348,080 B2
APPLICATION NO. : 16/889760
DATED : May 31, 2022
INVENTOR(S) : Guofei Jiang It is certified that error appears in the above-identified patent and that said Letters Patent is hereby corrected as shown below:

In the Claims

In Column 28, Line 14, Claim 1, replace "history," and insert -- history; --, therefor.

In Column 29, Line 47, Claim 9, replace "computer-implemented system," and insert -- computer-implemented tolling system; --, therefor.

In Column 29, Line 52, Claim 10, replace "computer-implemented system," and insert -- computer-implemented tolling system; --, therefor.

In Column 29, Line 56, Claim 11, replace "computer-implemented system," and insert -- computer-implemented tolling system; --, therefor.

In Column 29, Line 65, Claim 12, replace "computer-implemented system," and insert -- computer-implemented tolling system; --, therefor.

In Column 30, Line 4, Claim 13, replace "computer-implemented system," and insert -- computer-implemented tolling system; --, therefor.

Signed and Sealed this
Fifteenth Day of November, 2022

Katherine Kelly Vidal
*Director of the United States Patent and Trademark Office*